United States Patent
Boscoboinik et al.

(10) Patent No.: US 12,005,391 B2
(45) Date of Patent: Jun. 11, 2024

(54) METHOD FOR TRAPPING NOBLE GAS ATOMS AND MOLECULES IN OXIDE NANOCAGES

(71) Applicant: Brookhaven Science Associates, LLC, Upton, NY (US)

(72) Inventors: Jorge A. Boscoboinik, Stony Brook, NY (US); Mengen Wang, Coram, NY (US); Deyu Lu, South Setauket, NY (US); Nusnin Akter, Bronx, NY (US); Jianqiang Zhong, Berlin (DE); Yixin Xu, Port Jefferson, NY (US); Dario J. Stacchiola, South Setauket, NY (US); Alejandro Miguel Boscoboinik, Milwaukee, WI (US)

(73) Assignees: Brookhaven Science Associates, LLC, Upton, NY (US); The Research Foundation for the State University of New York, Stony Brook, NY (US)

( * ) Notice: Subject to any disclaimer, the term of this patent is extended or adjusted under 35 U.S.C. 154(b) by 468 days.

(21) Appl. No.: 17/008,198

(22) Filed: Aug. 31, 2020

(65) Prior Publication Data

US 2021/0178323 A1    Jun. 17, 2021

Related U.S. Application Data

(60) Provisional application No. 62/946,688, filed on Dec. 11, 2019.

(51) Int. Cl.
*B01D 53/32* (2006.01)
*B01D 53/76* (2006.01)
(Continued)

(52) U.S. Cl.
CPC ............. *B01D 53/32* (2013.01); *B01D 53/76* (2013.01); *B01J 20/28042* (2013.01);
(Continued)

(58) Field of Classification Search
CPC .............. B01J 20/28042; B01J 20/3297; B01J 20/3204; B01J 2220/42; B82Y 30/00;
(Continued)

(56) References Cited

U.S. PATENT DOCUMENTS 2,793,314 A    5/1957    White
3,475,123 A    10/1969    Wilson et al.
(Continued)

FOREIGN PATENT DOCUMENTS

EP    2985079 B1    2/2016
EP    1955351 B1    8/2019
(Continued)

OTHER PUBLICATIONS

Petala et al. (Magnetic Carbon Nanocages: An Advanced Architecture with Surface- and Morphology-Enhanced Removal Capacity for Arsenites, 2017, ACS Sustainable Chemistry & Engineering, 5, 5782-5792) (Year: 2017).*

(Continued)

*Primary Examiner* — Youngsul Jeong
(74) *Attorney, Agent, or Firm* — Dorene Price

(57) ABSTRACT

A method for trapping noble gas atoms and molecules in oxide nanocages that includes providing oxide nanocages on a metallic substrate, ionizing a noble gas to form noble gas cations, applying a voltage to the metallic substrate, contacting the oxide nanocages with the noble gas cations, and deionizing the cations to form noble gas atoms and molecules that are trapped within the oxide nanocages. In one embodiment of the present device, polygonal prism organosilicate cages on a ruthenium thin film can trap noble gases.

20 Claims, 21 Drawing Sheets

(51) Int. Cl.
*B01J 20/28* (2006.01)
*B01J 20/32* (2006.01)
*B82Y 30/00* (2011.01)
*B82Y 40/00* (2011.01)

(52) U.S. Cl.
CPC ....... *B01J 20/3204* (2013.01); *B01J 20/3297* (2013.01); *B01D 2253/106* (2013.01); *B01D 2253/34* (2013.01); *B01D 2257/11* (2013.01); *B01D 2258/02* (2013.01); *B01D 2259/10* (2013.01); *B01D 2259/818* (2013.01); *B01J 2220/42* (2013.01); *B82Y 30/00* (2013.01); *B82Y 40/00* (2013.01)

(58) Field of Classification Search
CPC ............. B82Y 40/00; B01D 2220/42; B01D 2253/34; B01D 2253/106; B01D 2257/11; B01D 2258/02; B01D 2259/10; B01D 2259/818; B01D 53/32; B01D 53/76
See application file for complete search history.

(56) References Cited

U.S. PATENT DOCUMENTS

| | | | |
|---|---|---|---|
| 3,671,238 | A | 6/1972 | Kaspaul |
| 4,356,150 | A | 10/1982 | Johnson et al. |
| 5,730,857 | A | 3/1998 | Baker et al. |
| 6,024,935 | A | 2/2000 | Mills et al. |
| 6,797,336 | B2 | 9/2004 | Garvey et al. |
| 6,841,044 | B1 | 1/2005 | Ruzic |
| 8,453,493 | B2 | 6/2013 | Wall et al. |
| 8,455,060 | B2 | 6/2013 | Tabat |
| 8,981,322 | B2 | 3/2015 | Tabat et al. |
| 8,986,569 | B2 | 3/2015 | Kullberg et al. |
| 9,437,428 | B2 | 9/2016 | Oota et al. |
| 9,559,617 | B2 | 1/2017 | Landa et al. |
| 9,662,632 | B1 * | 5/2017 | Allendorf .............. B01J 20/226 |
| 9,853,255 | B2 | 12/2017 | Adzic et al. |
| 9,856,145 | B2 | 1/2018 | Corma Canos et al. |
| 10,770,310 | B2 | 9/2020 | Yamazaki et al. |
| 10,876,202 | B2 | 12/2020 | Verbeck, IV et al. |
| 11,333,069 | B2 | 5/2022 | Mills |
| 11,344,572 | B2 | 5/2022 | Bishop et al. |
| 11,417,771 | B2 | 8/2022 | Yamazaki |
| 11,473,204 | B2 | 10/2022 | Abo-Hashema |
| 2008/0026932 | A1 | 1/2008 | Satoh et al. |
| 2009/0202655 | A1 | 8/2009 | Kuznicki |
| 2011/0114075 | A1 | 5/2011 | Mills |
| 2013/0149220 | A1 | 6/2013 | Swallow et al. |
| 2013/0153763 | A1 | 6/2013 | Saint |
| 2014/0102877 | A1 | 4/2014 | Yamazaki |
| 2014/0356265 | A1 | 12/2014 | Chen et al. |
| 2015/0171455 | A1 | 6/2015 | Mills |
| 2017/0070180 | A1 | 3/2017 | Mills |
| 2017/0304810 | A1 | 10/2017 | Bernadini et al. |
| 2019/0372449 | A1 | 12/2019 | Mills |
| 2021/0313606 | A1 | 10/2021 | Mills |

FOREIGN PATENT DOCUMENTS

| | | | |
|---|---|---|---|
| EP | 2548257 | B1 | 9/2019 |
| JP | H11186247 | A * | 7/1999 ............. H01L 21/31 |
| JP | 3313635 | B2 | 8/2002 |
| JP | 3750767 | B2 | 3/2006 |
| JP | 6827254 | B2 | 2/2021 |
| JP | 6904907 | B2 | 7/2021 |
| KR | 20180106166 | | 10/2018 |
| WO | 2002088020 | | 11/2002 |
| WO | 2008134451 | | 11/2008 |
| WO | 2019155113 | | 8/2019 |

OTHER PUBLICATIONS

Zhang et al. (Facile Synthesis of Pd—Pt Alloy Nanocages and Their Enhanced Performance for Preferential Oxidation of CO in Excess Hydrogen, 2011, ACS Nano, vol. 5, No. 10, 8212-8222) (Year: 2011).*

Nai et al. (Pearson's Principle Inspired Generalized Strategy for the Fabrication of Metal Hydroxide and Oxide Nanocages, 2013, Journal of the American Chemical Society, vol. 135, pp. 16082-16091) (Year: 2013).*

Li et al. (Convenient and large-scale synthesis of hollow graphene-like nanocages for electrochemical supercapacitor application, 2017, Chemical Engineering Journal, vol. 313, pp. 1242-1250) (Year: 2017).*

JPH11186247A_English (Year: 1997).*

Banerjee et al. (Metal-organic framework with optimally selective xenon adsorption and separation, 2015, Nature Communications, 7:11831 | DOI: 10.1038/ncomms11831) (Year: 2015).*

Zhong et al., "Ionization-Facilitated Formation of 2D Alumino (Silicate) Noble Gas Clathrate Compounds", Adv. Funct. Mater. 2019, 29, 1806583.

* cited by examiner

Color code: Ru (silver), Si (yellow), O in silica (red), and O chemisorbed on Ru (pink).

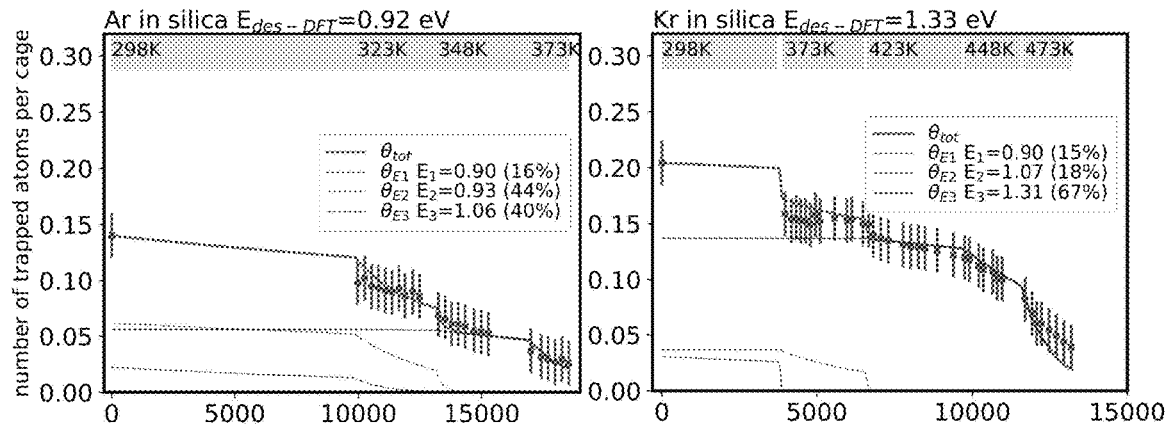
FIG. 10A
FIG. 10B
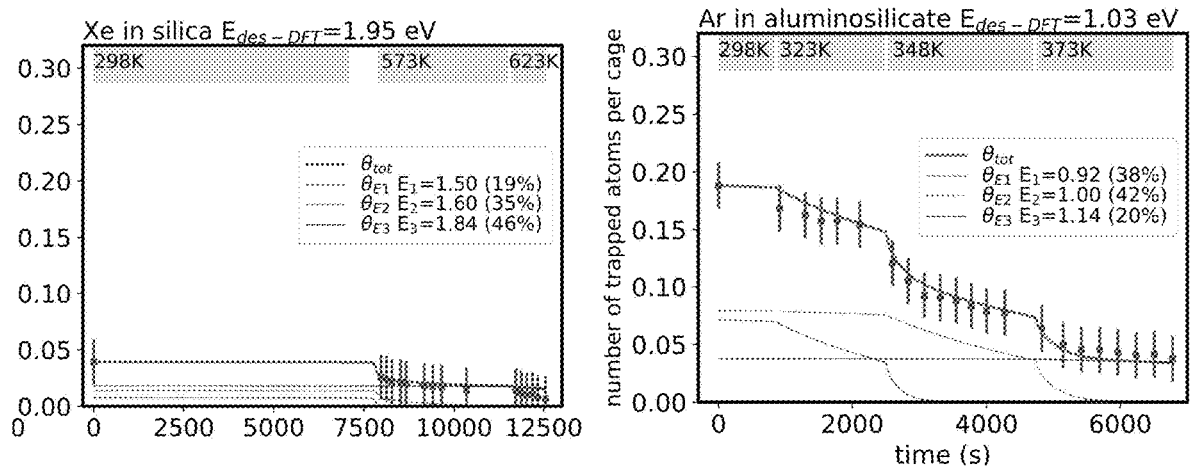
FIG. 10C
FIG. 10D

METHOD FOR TRAPPING NOBLE GAS ATOMS AND MOLECULES IN OXIDE NANOCAGES

This application claims priority from U.S. provisional patent application Ser. No. 62/946,688, filed on Dec. 11, 2019.

The present application was made with government support under contract number DE-SC0012704 awarded by the U.S. Department of Energy. The United States government has certain rights in the invention(s).

FIELD OF THE INVENTION

This application relates to nanoscale confinement of noble gases at non-cryogenic temperatures for applications including, for example, noble gas separations, nuclear waste remediation, and the removal of radon.

BACKGROUND OF INVENTION

Noble gases (elements in group 18 of the periodic table of the elements) are the most unreactive (inert) elements in the periodic table. Their condensation/boiling temperatures are 4 K for helium (He), 27 K for neon (Ne), 87 K for argon (Ar), 120 K for krypton (Kr), 165 K for xenon (Xe), and 211 K for radon (Rn). Consequently, immobilizing these elements on a surface normally requires very low temperatures. Trapping them at noncryogenic conditions is an industrially relevant challenge for energy, environment, and health applications. For example, radioactive isotopes of Kr and Xe are a byproduct of nuclear fission in nuclear plants and are volatile in nature. Studies have been devoted to the fundamental understanding of intrinsic physical and chemical properties of isolated noble gas atoms in confinement. Electrostatic trapping of Xe has been reported by using a boron nitride nanomesh formed on rhodium (Rh) 111, but it is at cryogenic temperatures. Ion implantation is a method that has been explored at room temperature to trap noble gas atoms under a 2D graphene cover by ionizing the atoms and accelerating them toward the surface under an applied electrostatic potential. However, the surface defects induced by ion implantation also result in uncontrolled noble gas "blisters." The nanoscale confinement of noble gases at noncryogenic temperatures presents a challenge due to weak trapping forces of the host matrices upon noble gas physisorption.

From a surface science perspective, the adsorption of a molecule on a surface can be either physisorption or chemisorption. While the former exhibit a small adsorption energy ($|\Delta E_{ads}|$) at the potential energy minimum due to weak van der Waals (vdW) interactions, the latter can bind a molecule lightly through chemical bonds with a much larger $|\Delta E_{ads}|$. It is difficult to form chemical bonds of certain strengths noble gas atoms and a surface. Therefore, the challenge of trapping noble gases under noncryogenic conditions may relate to the small $|\Delta E_{ads}|$ in physisorption.

Thin nanoporous materials (those with pores in the nanometer or subnanometer scale) can be useful for a variety of applications, including: (a) traps for atoms or molecules, (b) chemical catalysts, (c) coatings to change surface properties, (d) coatings to protect a surface from corrosion, chemical degradation, material loss, or dendrite formation, and (e) microporous membranes. A bottom-up approach to synthesize single-layer nanoporous silica on a metallic surface has been utilized. Therefore, there remains a need for a process that is an activated physisorption mechanism capable of trapping noble gas atoms with an ultrahigh desorption energy barrier $|\Delta E_{ads}|$.

SUMMARY OF THE INVENTION

The present invention is a method of trapping noble gas atoms or molecules that includes the steps of: providing a metallic substrate; forming one or more oxide nanocages on the metallic substrate to form a gas trapping assembly; contacting the gas trapping assembly with a noble gas comprising noble gas atoms or noble gas molecules; ionizing the noble gas to form noble gas cations that enter the one or more oxide nanocages; and deionizing the noble gas cations. Preferably, the noble gas is ionized using an ionizer. After the noble gas cations enter the one or more oxide nanocages of the gas trapping assembly, the deionization of the noble gas cations forms noble gas atoms or noble gas molecules that are trapped in the one or more oxide nanocages. The noble gas atoms or molecules trapped in the trapping assembly form clathrate compounds. The noble gases that can be trapped using the method include helium (He), neon (Ne), argon (Ar), krypton (Kr), xenon (Xe), or radon (Rn).

The metallic substrate can be a thin sheet or thin film and can be selected from the group consisting of ruthenium (Ru), nickel (Ni), iron (Fe), copper (Cu), gold (Au), and cobalt (Co). Preferably, the metallic substrate is a porous metallic substrate.

The oxide nanocages are preferably made of silica or aluminosilicate and can also include an additional component selected from the group consisting of aluminum, titanium, iron, boron, and phosphorus. The oxide nanocages are polygonal prism oxide nanocages, preferably cubic oxide nanocages, pentagonal prism oxide nanocages, hexagonal prism oxide nanocages, heptagonal prism oxide nanocages, or octagonal prism oxide nanocages. Preferably, the oxide nanocages have a plurality of openings with a maximum dimension that is less than the size of at least one noble gas atom or molecule. Most preferably, the plurality of openings having a maximum dimension of less than 2.80 Å, which is the size of the smallest noble gas, helium. However, the dimensions of the openings in the nanocages can be selected to trap noble atoms of a specific minimum size. After the noble gas cations are deionized, the one or more oxide nanocages can be separated from the metallic substrate.

A voltage can be applied to the metallic substrate prior to ionizing the noble gas to attract the noble gas cations formed by the ionization into the oxide cages. The noble gas cations gain electrons from the metallic substrate after entering the one or more oxide nanocages and form noble gas atoms or noble gas molecules. The noble gas cations can also gain the electrons from deionization after the cations are inside the oxide nanocages. Preferably, the noble gas contacts the gas trapping assembly in a sealed chamber and/or at a temperature of at least 70° F.

BRIEF DESCRIPTION OF THE FIGURES

The preferred embodiments of the method for trapping noble gas atoms and molecules in oxide nanocages of the present invention, as well as other objects, features and advantages of this invention, will be apparent from the accompanying drawings wherein:

FIGS. 10A-F are graphs showing the desorption of trapped noble gases (argon, krypton, and xenon, respectively) 2D-silica bilayer (10A-C) and 2D-aluminosilicate bilayer (10D-F).

DETAILED DESCRIPTION OF THE INVENTION

Figure 1A:
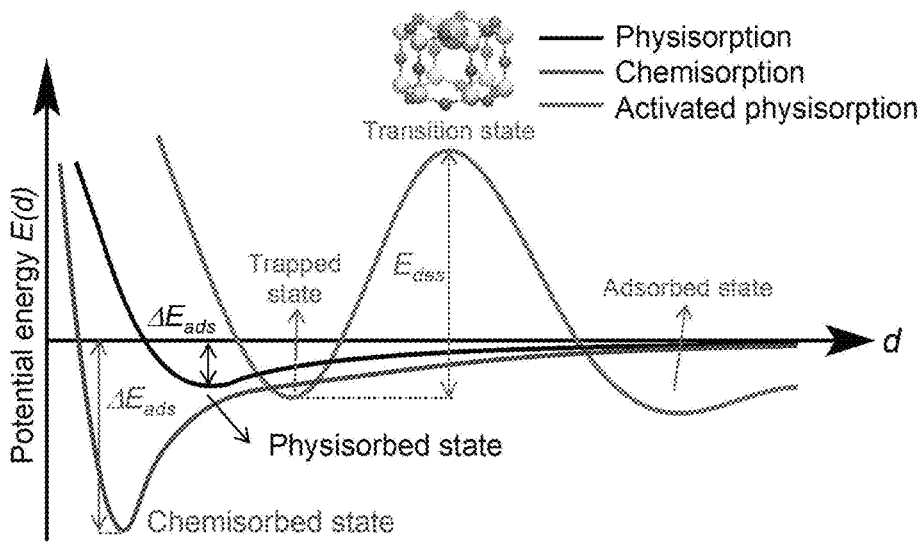
FIG. 1A is a potential energy diagram of 2D silica bilayer film.
Figure 1B:
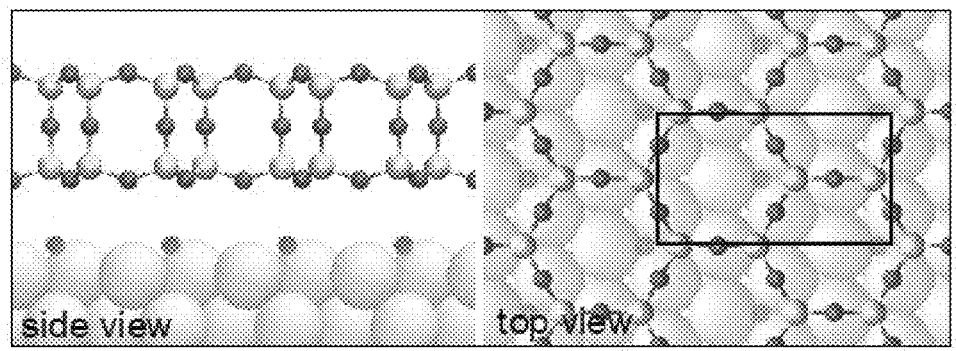
FIG. 1B is side and top views of a 2D silica bilayer film.
Figure 1C:
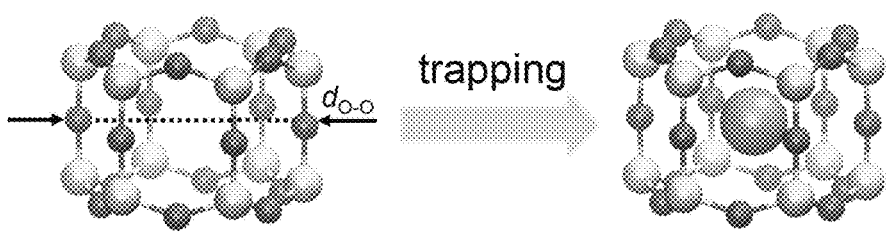
FIG. 1C shows a side view of oxide nanocages before and after a noble gas atom is trapped.

The present method is an activated physisorption mechanism that traps noble gas atoms with an ultrahigh desorption energy barrier $|\Delta E_{ads}|$ as shown in FIGS. 1A-C. FIG. 1A is a schematic diagram of the potential energies against the distance from contact surface (d) for physisorption, chemisorption, and activated physisorption, respectively. $\Delta E_{ads}$, represents the adsorption energy; $E_{des}$ represents the desorption energy barrier for activated physisorption. FIG. 1B is a side (left) and top (right) views of the 2D silica bilayer film adsorbed on p(2×1)-O/Ru(0001) (i.e., $(SiO_2)_8$/4O/Ru(0001)). The black rectangle on the top view indicates the unit cell. FIG. 1C illustrates the nanocages in the framework with and without the noble gas atom trapped inside. FIGS. 1A-C use the color code: Ru (silver). Si (yellow), O in silica (red), and O chemisorbed on Ru (pink). This trapping process forms 2D clathrate compounds, where noble gases are immobilized in the nanocages of the host 2D (alumino)silicate.

The present process is capable of forming clathrate compounds, which results from trapping noble gas atoms (e.g., Ar, Kr, and Xe) inside nanocages of ultrathin silica and aluminosilicate crystalline nanoporous frameworks at 300 K.

In an embodiment of the present process, 2D clathrate compounds are formed from trapping noble gas atoms (e.g., Ar, Kr, and Xe) inside nanocages of ultrathin silica and aluminosilicate crystalline nanoporous frameworks at 300 K. The formation of the 2D clathrate compounds is attributed to an activated physisorption mechanism, facilitated by ionization of noble gas atoms. Combined X-ray photoelectron spectroscopy (XPS) and density functional theory (DFT) studies provide evidence of an initial ionization process that reduces the apparent trapping barrier. Noble gas ions become neutralized upon entering the cages, and their desorption utilizes high temperatures, even in ultrahigh vacuum conditions. From 2D aluminosilicate films, these temperatures are 348 K for Ar, 498 K for Kr, and 673 K for Xe. DFT calculations also predict that Rn can be trapped in 2D aluminosilicates with an even higher desorption temperature of 775 K. The present process is an ionization-facilitated trapping mechanism that results in a thin family of clathrates.

The present process is a top-down method of making doped silicate nanosheets using ionic materials. The thin nanoporous material can be used in various applications including trapping of noble gases such as argon (Ar).

The present device is a nanoporous material placed on a conducting surface along with an ionizing radiation source with ionizing capability for producing a cation, for example, an ionizer. A variety of different ionizers for producing cations are know to those skilled in the art, including ionizers that use a Tesla coil. A bias voltage (i.e., an electrical current) is applied to the conducting plate of the present device to attract positively ionized atoms (i.e., cations) or molecules toward the porous material, where they are trapped. The present device does not require the bias voltage for trapping material but applying the bias voltage enhances movement toward the porous material. Ambient pressure X-ray photoelectron spectroscopy (XPS) has confirmed that polygonal prism organosilicate cages on a ruthenium thin film can trap noble gases.

Figure 2:
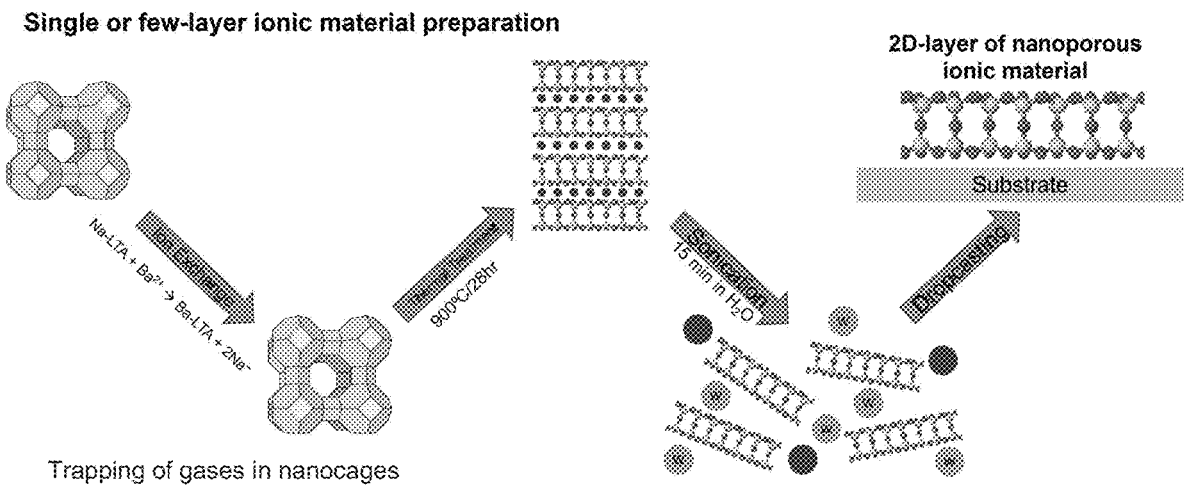
FIG. 2 is a diagram illustrating the method of trapping noble gases in nanocages.
Figure 3:
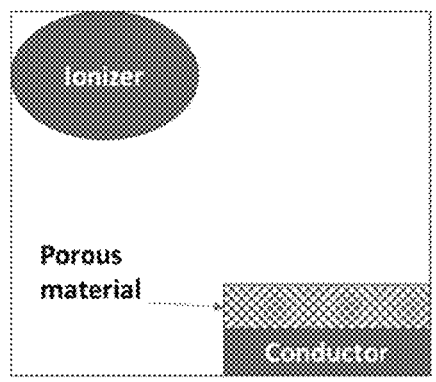
FIG. 3 shows an exemplary scheme of the method for trapping noble gas atoms.
Figure 4:
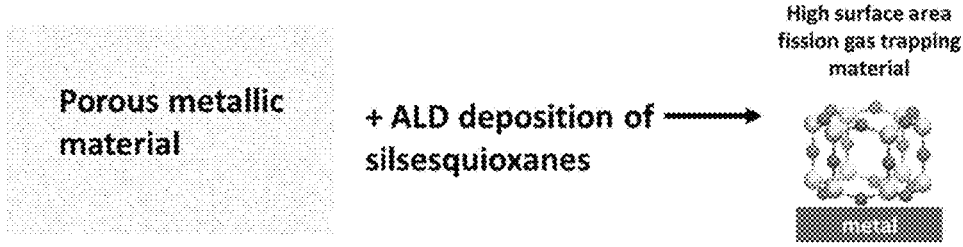
FIG. 4 is a diagram showing the preparation of the noble gas trapping assembly.
Figure 5A:
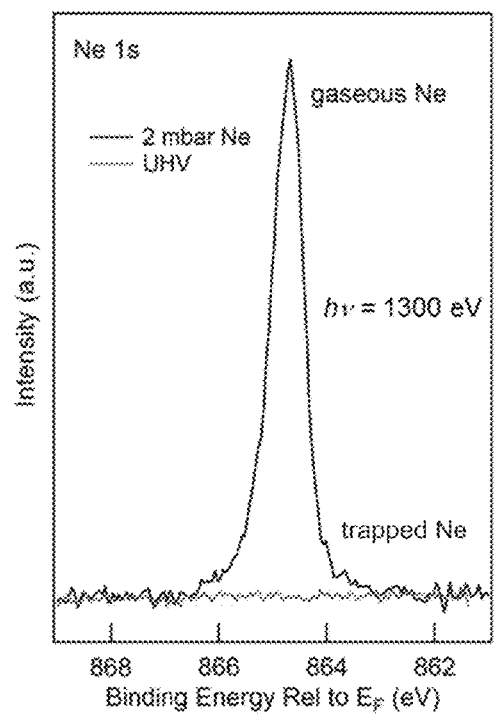
FIGS. 5A-D are graphs of XPS spectra of noble gas atoms (neon, argon, krypton, and xenon, respectively) in 2D-silica bilayer.
Figure 5B:
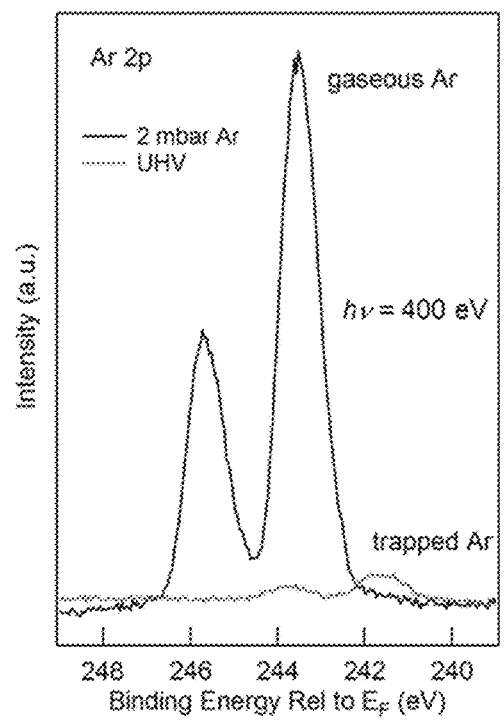
Figure 5C:
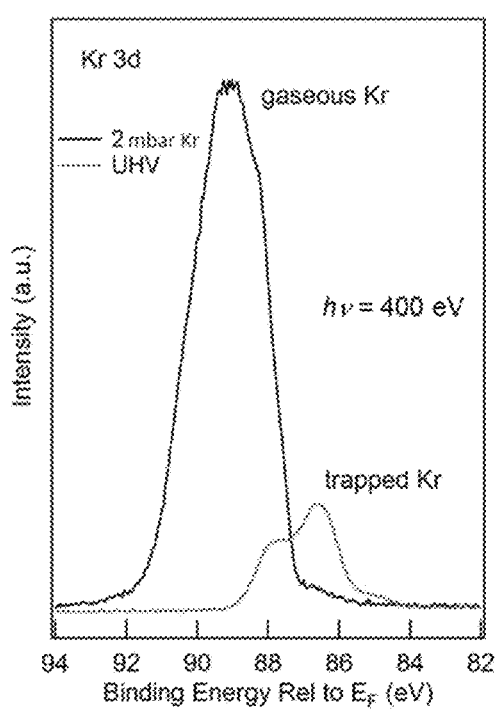
Figure 5D:
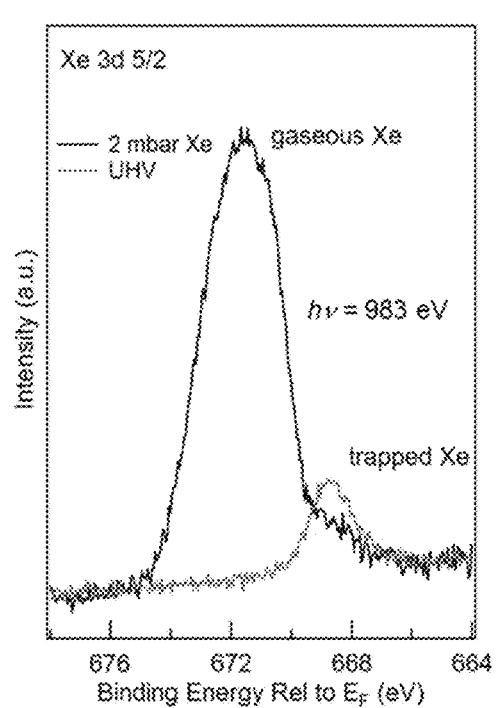

The present device traps atoms and molecules using the following components: component A: conducting material where a bias voltage can be applied, component B: a porous or nanoporous material, and component C: an ionizer mechanism such as an ionizing radiation source (for example an ionizer). In the present device, components A and B are in physical contact with one another. The atoms and/or molecules are ionized in the ionizer generating a positively ionized atom and/or positively ionized molecule, and the positively ionized atoms and/or positively ionized molecules are trapped in the porous material upon entering the pore of the porous material and becoming neutral or neutralized (deionized). A bias voltage in component A can aid in the process of attracting the ionized atom and/or ionized molecules toward the porous or nanoporous material. While the bias voltage can enhance or accelerate the trapping, the device works in the absence of bias voltage being applied. A sketch illustrating the present method of trapping gases in nanocages is shown in FIG. 2. An exemplary scheme of the present device is shown in FIG. 3. Other configurations can also be achieved.

The present material can be prepared by, for example: 1) a bottom-up approach by evaporating precursors on a flat support and crystallizing to form the structure with polygonal prism oxide cages, or 2) by delaminating a layered ionic material that contains polygonal prism oxide cages, or 3) by using silsesquioxane cages as starting materials.

The polygonal prism oxide cages can be used for: a) trapping single atoms or molecules, b) protecting a surface from corrosion or degradation, or c) protecting photocathodes and electron emitters. The method of trapping gases, in particular noble gases, can be applied to: i) generation of medical isotopes, ii) reduction of radioactive noble gas emissions in nuclear power plants, iii) testing devices in nuclear non-proliferation applications, iv) electron emitters, or v) gas separation.

The foregoing summary is illustrative only and is not intended to be in any way limiting. In addition to the illustrative aspects, embodiments, and features described above, further aspects, embodiments, and features will become apparent by reference to the drawings and the following detailed description.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

As used herein, the term physisorption (also called physical adsorption) refers to the physical bonding of gas molecules to the surface of a solid or liquid that the gas comes into contact with at low temperatures. This occurs due to van der Waals forces. The weak, long-range bonding is not surface specific and takes place between all gas molecules on any surface. The process, which does not involve any surface reaction, is achieved quickly at low temperatures, but surface coverage reduces with temperature increase. Physisorption is used when measuring the total surface area and in pore size analysis of mesopores, micropores and nanopores.

As used herein, the term "desorption temperature" refers to when molecules or atoms come into contact with a surface and adsorb onto it, which minimizes their energy by forming a bond with the surface. The binding energy varies with the combination of the adsorbate and surface. When the surface is heated, the energy transferred to the adsorbed species will cause it to desorb at a certain point. The temperature at which this happens is known as the desorption temperature.

As used herein, the term "chemisorption" (also known as chemical adsorption) refers to a kind of adsorption, which involves a chemical reaction between the surface and the adsorbate. New chemical bonds are generated at the adsorbent surface. Chemisorption of certain vapors and solid materials is achieved by substantial sharing of electrons between the surface of adsorbent and adsorbate to create a covalent or ionic bond.

As used herein, the term "clathrate compounds" refers to a substance consisting of molecules of one element or compound contained within the cage-like structure of another. Traditionally, clathrate compounds are polymeric and completely envelop the guest molecule, but in modern usage clathrates also include host-guest complexes and inclusion compounds.

As used herein, the term "ionization" refers to the loss of an electron from a neutral atom or molecule. The resulting electrically charged atom or molecule is called a "cation." For the purposes of this disclosure, the terms "ionization," "ionized," and "ion" refer only to positive ions (i.e., cations) and not to negatively charged ions (i.e., anions). Since the nucleus of the positive ion holds the decreased number of electrons more tightly than the electrons of the neutral atom, the positive ion is smaller than the neutral atom from which it forms. This is one of the factors that allows a cation to pass through openings in a polygonal prism oxide nanocages and become trapped after returning to its neutral atom form.

The oxide nanocages, preferably polygonal prism oxide nanocages, are building blocks of material active in trapping single atoms or molecules of gases. In addition to use in this gas-trapping application, other forms can be used to obtain nanosheets made of polygonal prism cages by using layered ionic doped silicates as the source to prepare single and/or multilayer nanoporous doped silicate nanosheets. These can be obtained from delamination or exfoliation of the layered ionic materials composed of anionic nanoporous doped silicate nanosheets and cations separating the layers.

The oxide nanocages can be produced by different methods, including synthesis on a metal support (bottom-up approach), and also a top-down approach that can result in materials with thicknesses varying between 1 and 20 layers of nanoporous doped silicate nanosheets. The nanoporous doped silicate nanosheets are obtained by delamination or exfoliation of a layered ionic material composed of anionic nanoporous doped silicate nanosheets and cations between the nanosheets compensating the charge. The doped silicate nanosheets have pores that are perpendicular to the nanosheet plane of sizes varying between 0.2 nm and 10 nm and dopants including the elements boron, aluminum, gallium, indium, gallium, carbon, germanium, tin, lead, phosphorus, scandium, yttrium, lanthanides, actinides, titanium, zirconium, hafnium, iron, cobalt and nickel, with dopants concentrations between 0% and 50%. Nanocages obtained in a different way, including silsesquioxane or polyoctahedral silsesquioxanes (POSS) can also be used for the same applications for trapping of gases in the polygonal prism oxide nanocages.

A bottom-up approach has been proposed for synthesizing a single layer of these doped silicates, as opposed to the top-down approach described herein. Other methods have been used before to produce single or multilayer nanoporous materials, but using non-ionic materials as the starting materials. In the present approach, a starting material can be a layered ionic material.

The present method is used to trap gases in polygonal prism cages, in particular noble gases—neon, argon, krypton, xenon, and radon and their isotopes. The nanocages are defined by tetrahedral atoms in the corners of the prisms, preferably silicon or silicon plus aluminum, and oxygen atoms linking the tetrahedral atoms and defining the edges of the prism. FIG. 1C shows a polygonal prism cage, in this case a hexagonal prism cage, used in the present invention. Yellow atoms are the tetrahedral atoms (commonly, but not exclusively silicon or silicon plus aluminum). Red atoms are oxygen atoms. The process of trapping a gas atom is shown on the right of FIG. 1C, where a gas atom is shown in light blue in the middle of the hexagonal prism. The gases are positively ionized to decrease the size of the atoms and/or molecules prior to entering the cage and are neutralized after they enter the cage to return them to their original size.

The ionization of the gases induces a state of the gas that allows them to enter the cages. Upon entering the cages, the noble gases gain an electron from the surroundings, preferably the metallic substrate, to change back to their neutral state, which increases their size and prevents them from escaping the cages. Therefore, resulting in the trapping of the noble gases.

The present materials can have a small surface area or a large surface area. The materials having a small surface area are less desirable for certain applications. Alternatively, porous materials can have a large surface area as a starting point. A conductive film can then be grown followed by deposition of a porous film by atomic layer deposition (ALD) for synthesis of large surface area materials.

Delaminated ionic nanoporous ultrathin layered doped silicates can be obtained from ionic layered materials having multiple layers, preferably between 1 and 20. The materials in these layers form cages that can trap gases, and are useful in a variety of applications.

The nanocages forming the aluminosilicate can provide a fit for single atoms of all noble gases, which can enter the cages as cations prior to being trapped in the neutral state. The single atoms remain in the nanocages up to or at high temperatures. Immobilizing noble gas atoms in a controlled way has a range of applications, including in the nuclear energy industry and U.S. government nuclear nonproliferation programs, as well as the production of radiological medical isotopes. The present structures can be used as protective coatings to prevent corrosion, or to protect photocathodes and electron emitters in general or from degradation.

The present process is an activated physisorption (also called physical adsorption) mechanism that traps noble gas atoms with an ultrahigh desorption energy barrier $|\Delta E_{ads}|$ as shown in FIG. 1A. This trapping process forms 2D clathrate compounds, where noble gases are immobilized in the nanocages of the host 2D (alumino)silicate. The clathrate compounds have molecules or atoms of one component (e.g., noble gases) trapped, physically within the nanocages (i.e., crystal structure) of another structure.

The process forms clathrate compounds, when noble gas atoms (e.g., Ar, Kr, and Xe) are trapped inside nanocages of ultrathin silica and aluminosilicate crystalline nanoporous frameworks at room temperature 295-300 K). In an embodiment of the present process, 2D clathrate compounds are formed from trapping noble gas atoms (e.g., Ar, Kr, and Xe) inside nanocages of ultrathin silica and aluminosilicate crystalline nanoporous frameworks at ≈295-300 K. The formation of the 2D clathrate compounds is attributed to an activated physisorption mechanism, facilitated by ionization of noble gas atoms. Combined X-ray photoelectron spectroscopy (XPS) and density functional theory (DFT) studies provide evidence of an initial ionization process that reduces the apparent trapping barrier. Noble gas cations become neutralized upon entering the cages, and their desorption utilizes high temperatures, even in ultrahigh vacuum conditions. From 2D aluminosilicate films, these temperatures are 348 K (Ar), 498 K (Kr), and 673 K (Xe). DFT calculations also predict that Rn can be trapped in 2D aluminosilicates with an even higher desorption temperature of 775 K. The present process is an ionization-facilitated trapping mechanism that can result in a thin family of clathrates.

2D (alumino)silicates (silica: $SiO_2$ and aluminosilicate: $Al_xSi_{1-x}O_2$) are ultrathin nanoporous crystalline frameworks. Their structures are shown in FIG. 1B. These frameworks are model systems for surface science studies of zeolites which are known catalysts and sorbent materials. The well-ordered or ordered 2D (alumino)silicate frameworks with a thickness less than 5 Å were grown on a Ru(0001) surface, in which the distance between the (alumina) silicate framework and the ruthenium surface ranged between 2 and 4 Å depending on the coverage of interfacial chemisorbed oxygen. Other supports can be, for example Pt(111), Pd(111), Pd(100), and $Ni_xPd_{1-x}$(111) alloys. The building unit of such a bilayer framework is the hexagonal prism nanocage shown in FIG. 1C. Also, high solubility of noble gases was recently reported for a naturally occurring (alumino)silicate mineral that also contains hexagonal rings, in the context of rationalizing the higher than-expected concentration of noble gases in the earth mantle.

2D (alumino) silicate films can trap single Ar atoms, where both desorption measurements and density functional theory (DFT) calculations point to a high desorption barrier of about 1 eV. Since the activation energy barrier for Ar to enter these nanocages is at a similar magnitude (=1 eV), it is not apparent how Ar atoms get trapped inside nanocages at room temperature below the atmosphere pressure. Based on DFT calculations, the energy barrier would appear to be too high for Ar to go through the nanopores in the 2D silica films. However, it has been found that noble gas trapping by 2D (alumino)silicate films can be an activated physisorption process. This is due to a strong ionization-induced trapping/desorption activation barrier imparity, which suggests that noble gas atoms enter the nanocages in the form of ions with a significantly reduced trapping energy barrier and exit as neutral atoms with an ultrahigh desorption energy barrier. It was also found that 2D (alumina) silicate films can trap individual atoms of Ar, Kr, and Xe with high kinetic stability, while He and Ne, due to their relatively small sizes, require smaller nanocages. DFT calculations can predict the trapping of Rn. Unlike ion implantation, the present trapping process is nondestructive as it does not create defects on the 2D (alumino)silicate. This makes the trapping and release processes reversible. Moreover, the differences in thermal stabilities of noble gases can be exploited to separate a mixture of Ar, Kr, and Xe.

Noble Gas Trapping

Trapping noble gas atoms in (alumino)silicate nanocages is demonstrated in situ by X-ray photoelectron spectroscopy (XPS). A silica bilayer was separately exposed to low pressures(≈2 mbar) of individual noble gases (He, Ne, Ar, Kr, and Xe) at room temperature. Simultaneously acquired ambient pressure XPS (AP-XPS) spectra showed strong gas phase core level peaks (see FIGS. 5A-D). As the gas pressure was lowered, these gas phase peaks decreased and eventually disappeared, while newly evident peaks located at the lower electron binding energy ($E_{BE}$) side remained over time even after evacuating the experimental chamber in the cases of Ne, Ar, Kr, and Xe, as shown in FIGS. 5A-D. These peaks were assigned to trapped noble gas atoms in the silica bilayer/Ru(0001) system. Consistent with previous results, while most trapped atoms were located in the cages, there was a small fraction of noble gas atoms located as well at the interface between the silica/Ru(0001) interface. This set of minority species was evident in the deconvolution of the Ar 2p, Kr 3d, and Xe $3d_{s/2}$ core level spectra shown in FIGS. 6A-6C (FIGS. 6A—Ar 2p; 6B—Kr 3d; and 6C—Xe 3ds/2, respectively) as a small component on the lower binding energy side. The peak assignment was in agreement with DFT calculations, from which the electron binding energy ($E_{BE}$) for atoms trapped in the cages and at the interface are summarized in Table 1. Note that as part of the AP-XPS measurements, a fraction of the gas phase molecules can be ionized, which can play a role in the trapping mechanism and will be discussed in the following section. A rough estimation based on the beam size, photon flux, gas pressure, photoionization cross section, and system geometry can give a rate of ion generation inside of the experimental chamber in the order of $10^{11}$ ions s$^{-1}$. However, only a small fraction of these ions is expected to reach the sample surface. The size of the nanocages in silica frameworks can be ≈3.2 Å, defined by subtracting the van der Waals (vdW) diameter of an O atom (≈3.0 Å) from the O—O distance (6.2 Å) at opposite sides of the middle layer of the nanocage. Considering the vdW diameter of the noble gas atoms (i.e., He≈2.80 Å, Ne≈3.08 Å, Ar≈3.76 Å, Kr≈4.04 Å, Xe≈4.32 Å, and Rn≈4.40 Å), He and Ne atoms can be too small to be trapped in frameworks of ≈3.2 Å and require smaller frameworks, while Ar, Kr, Xe, and Rn atoms can be of a size (i.e., slightly larger than the cage) capable of remaining in the nanocages at room temperature.

TABLE 1

|  | Ar | Kr | Xe |
| --- | --- | --- | --- |
| Θ = 0.25 | 1.12 | 0.91 | 0.47 |
| Θ = 0.5 | 1.02 | 0.85 | 0.51 |

DFT simulated core-level binding energy ($E_{BE}$) for Ar, Kr and Xe in the nano-cages relative to that of Ar, Kr and Xe at the interface. All $E_{BE}$ values are calculated using 1 × 1 (a = 5.392 Å and b = 9.339 Å), 2 × 1 (a = 10.784 Å and b = 9.339 Å) and 4 × 2 (a = 21.568 Å and b = 18.678 Å) supercells for gas-(SiO$_2$)$_8$/4O/Ru(0001) (Θ = 0.50) and 2 × 1 (a = 10.784 Å and b = 9.339 Å), 2 × 2 (a = 10.784 Å and b = 18.678 Å) and 4 × 2 (a = 21.568 Å and b = 18.678 Å) supercells for gas-(SiO$_2$)$_{16}$/8O/Ru(0001) (Θ = 0.25), and extrapolated to the infinite supercell limit. The energy unit is eV.

Figure 8:
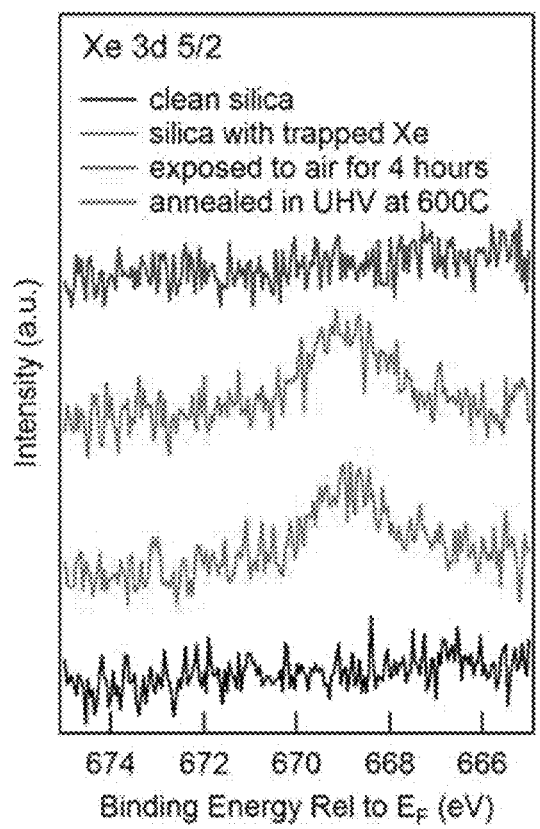
FIG. 8 is a graph of UHV XPS spectra of xenon atoms trapped in 2D-silica bilayer for four hours.

Aside from the silica bilayer, the aluminosilicate bilayer films can also trap Ar, Kr, and Xe. XPS spectra of trapped noble gas atoms, Ar, Kr, and Xe, in an aluminosilicate film (Al$_{0.33}$Si$_{0.67}$O$_2$) are plotted in FIGS. 6A-C (FIGS. 6A—Ar; 6B—Kr; and 6C—Xe, respectively) at increasing temperatures. The aluminosilicate has stronger electrostatic interactions with the metal support, resulting in an interfacial space that is too small to trap noble gases. Therefore, the XPS peaks are assigned to noble gas atoms trapped in the nanocages of the aluminosilicate film. Desorption of these trapped noble gas atoms at 300 K is slow for Ar and negligible for Kr and Xe. For example, it has been found that only 25% of trapped Ar atoms desorb in the ultrahigh vacuum (UHV) after 12 hours. In the present experiments, there appears to be substantially or virtually no desorption for trapped Kr and Xe atoms at room temperature. The air stability of the noble gas atoms in the nanocages was tested by taking a silica bilayer sample with Xe trapped within and exposing it to air for 4 hours before putting it back into the experimental chamber. XPS spectra of the Xe 3d core level (FIG. 8) were taken before and after air exposure, showing that Xe atoms remained trapped. The UHV XPS spectra of Xe 3d5/2 (hv=1253.6 eV) showed that the trapped Xe atoms in 2D-silica bilayer are very stable even when the film was exposed to the air for 4 hours.

Figure 9A:
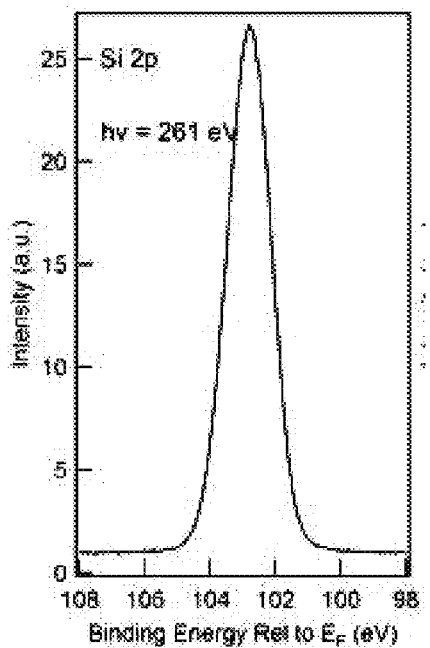
FIGS. 9A-B are graphs of UHV XPS spectra of Si 2p and Ar 2p from argon trapped in 2D-silica bilayer.
Figure 9B:
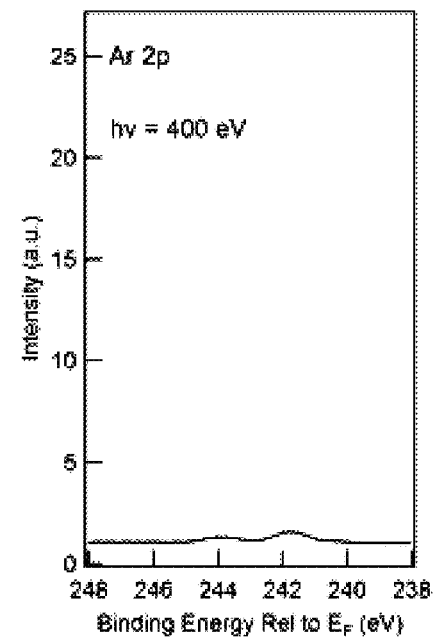

The noble gas coverage Θ, defined as the number of trapped noble gas atoms per nanocage, is estimated by the ratio of the XPS peak areas between the Ar 2p (FIG. 9A), Kr 3d or Xe 3d, and Si 2p (FIG. 9B), taking into account the photoionization cross sections for each core level at the used photon energy. The photon energies were chosen in order to have the same photoelectron kinetic energy, and thus the same electron transmission function, for all cases. The estimated saturation coverages are $\Theta_{sat}$=0.14±0.02, 0.20±0.02, and 0.04±0.02 for Ar, Kr, and Xe on the silica bilayer, respectively (FIGS. 10A-C). In the case of the aluminosilicate (Al$_{0.33}$Si$_{0.67}$O$_2$), these coverages are higher, i.e., 0.18±0.02 (Ar), 0.26±0.02 (Kr), and 0.12±0.02 (Xe) (FIGS. 10D-F). A higher $\Theta_{sat}$ in aluminosilicates than silica can be attributed to their larger trapping energies as will be discussed in the following section. Note that vitreous regions are sometimes found on the surface in addition to the hexagonal prisms, especially for silica, and this can result in underestimating the coverage since the total density of hexagonal prism nanocages can be smaller than in the ideal crystalline structure. The number of trapped atoms per cage (Θ) is obtained from the normalized XPS peak areas (Ar 2p, Kr 3d, and Xe 3d) (blue dots). All XPS data are collected under UHV conditions after FIGS. 10A,D—2 mbar Ar; FIGS. 10B,E—2 mbar Kr; and FIGS. 10 C,F—2 mbar Xe exposures. The error bars from XPS are ±0.02 atoms per cage. The desorption curve (red curves) is fitted with three energy barriers, $E_{des}$ ($E_1$, $E_2$, and $E_3$) by using the pre-exponential factors from transition state theory. Dotted blue, green, and black curves represent desorption Θ-t curves for gas trapped at the three fitted energy barriers. $E_{des-DFT}$ are DFT calculated desorption energy barriers with zero-point energy (ZPE) correction (Θ=0.25).

Figure 11A:
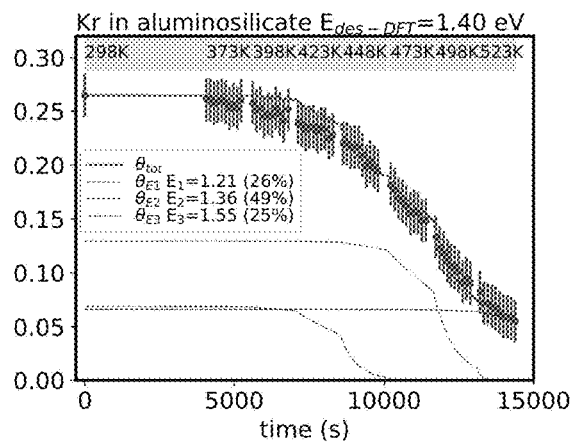
FIGS. 11A-I are side and top views of a relaxed 2D-silica bilayer (11A) and side and top views of argon, krypton, xenon, and radon (11B-C, D-E, F-G, and H-I, respectively) at Θ=0.25 and 0.5, respectively.
Figure 11A:
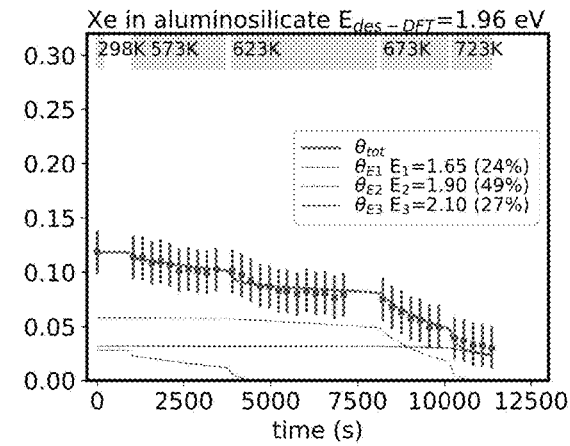
Figure 11A:
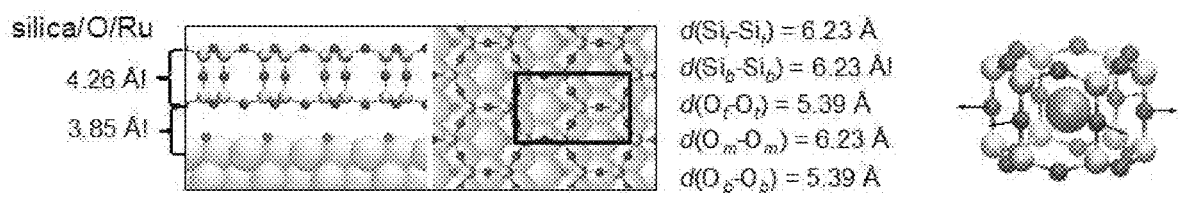
Figure 11B:
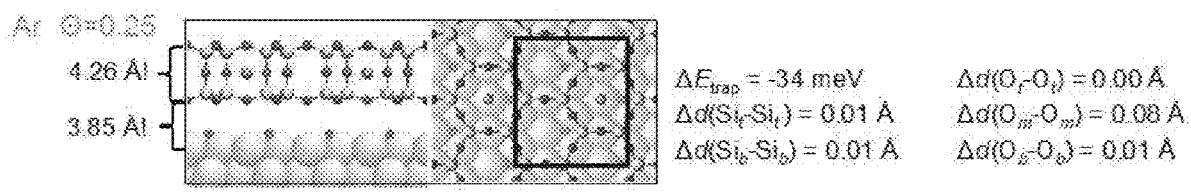
Figure 11C:
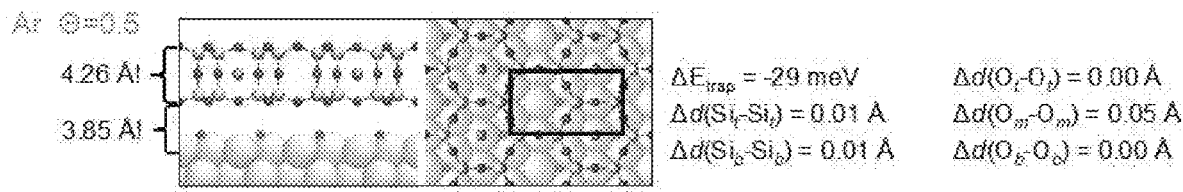
Figure 11D:
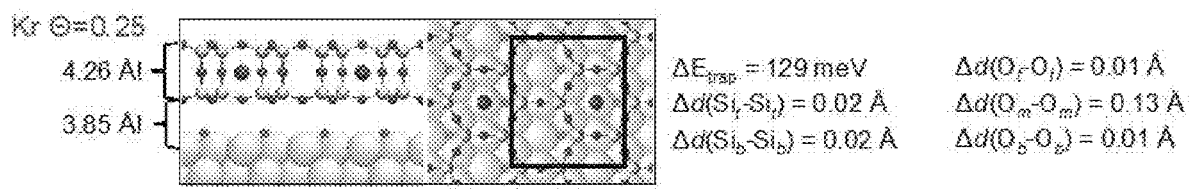
Figure 11E:
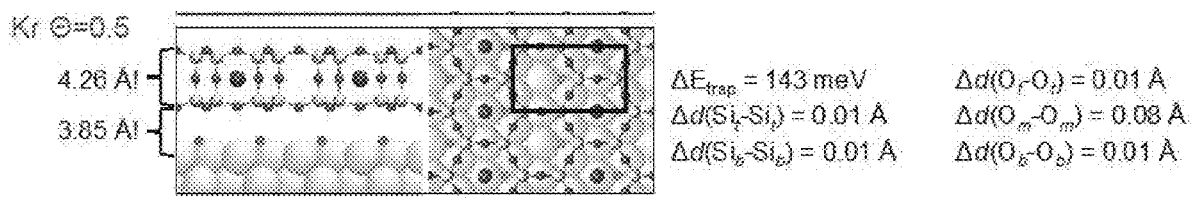
Figure 11F:
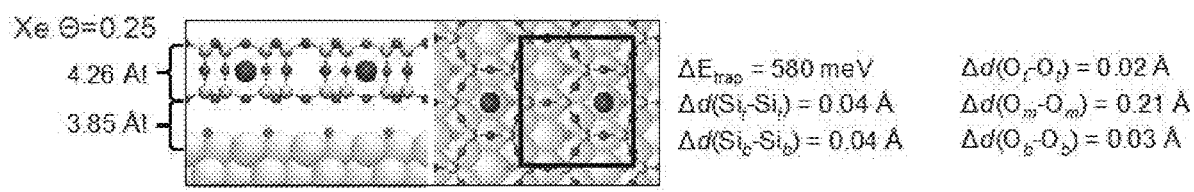
Figure 11G:
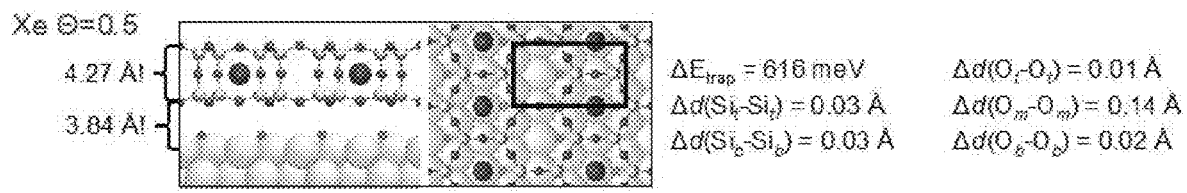
Figure 11H:
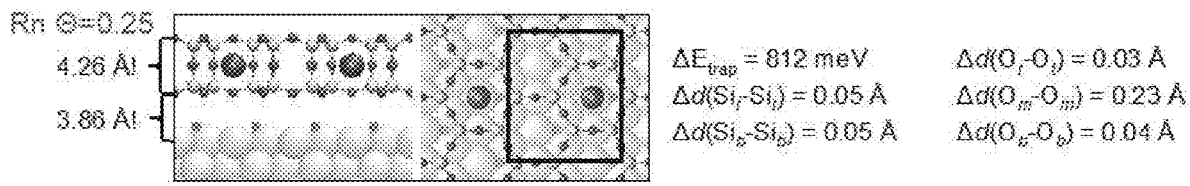
Figure 11I:
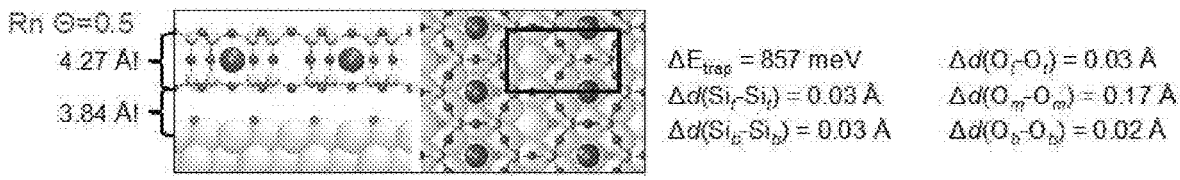
Figure 12A:
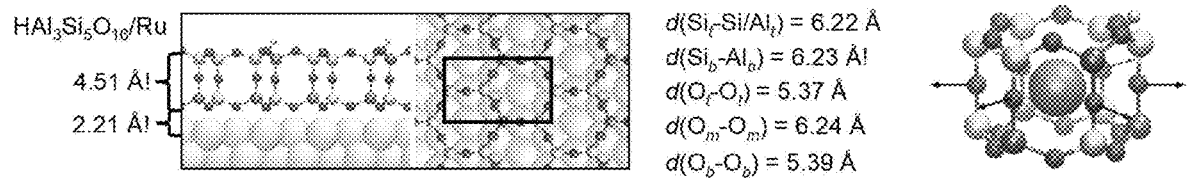
FIGS. 12A-I are side and top views of a relaxed 2D-aluminosilica bilayer (12A) and side and top views of argon, krypton, xenon, and radon (12B-C, D-E, F-G, and H-I, respectively) at Θ=0.25 and 0.5, respectively.
Figure 12B:
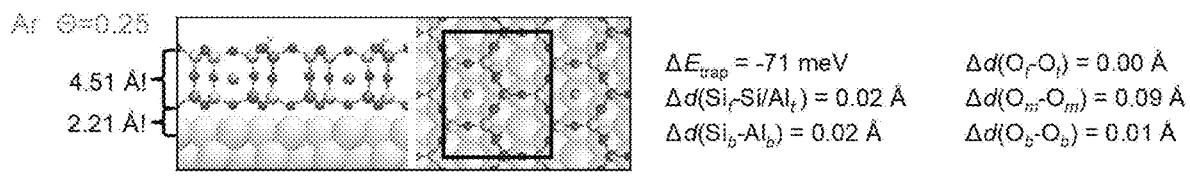
Figure 12C:
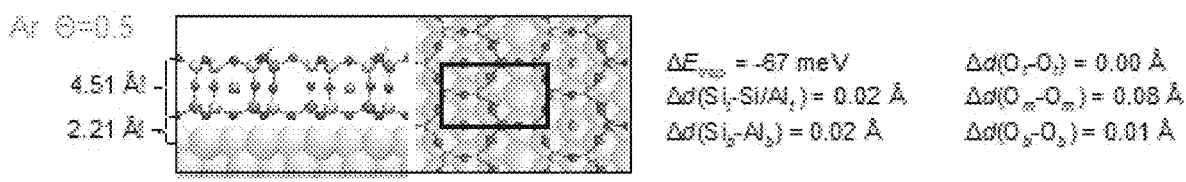
Figure 12D:
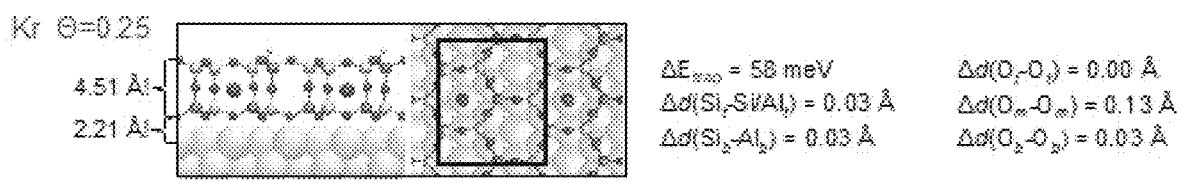
Figure 12E:
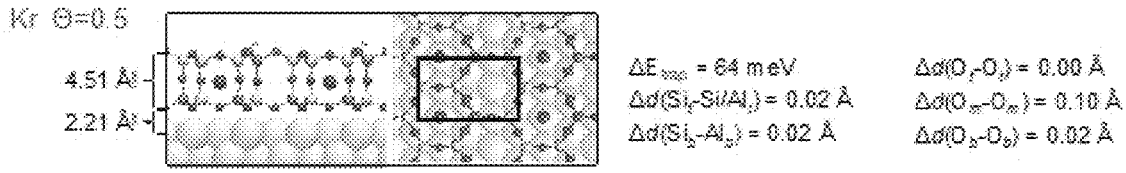
Figure 12F:
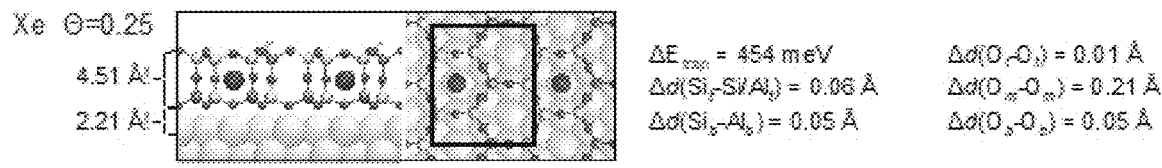
Figure 12G:
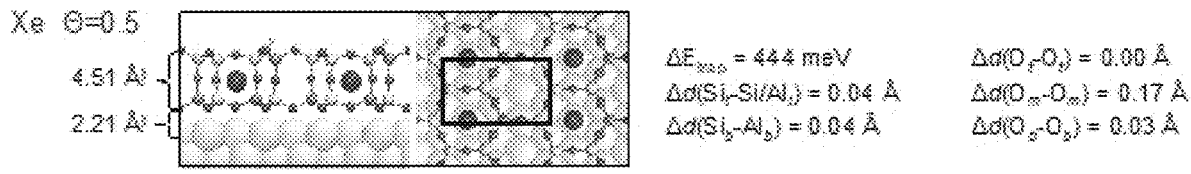
Figure 12H:
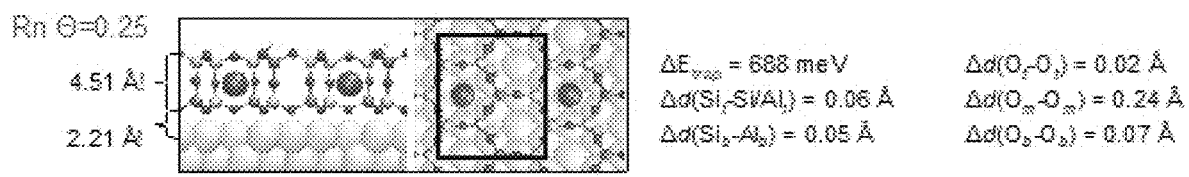
Figure 12I:
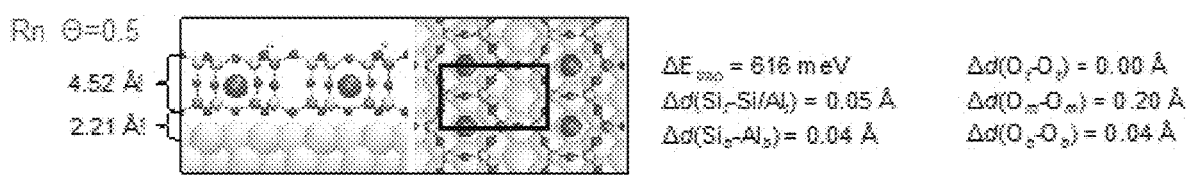
Figure 13:
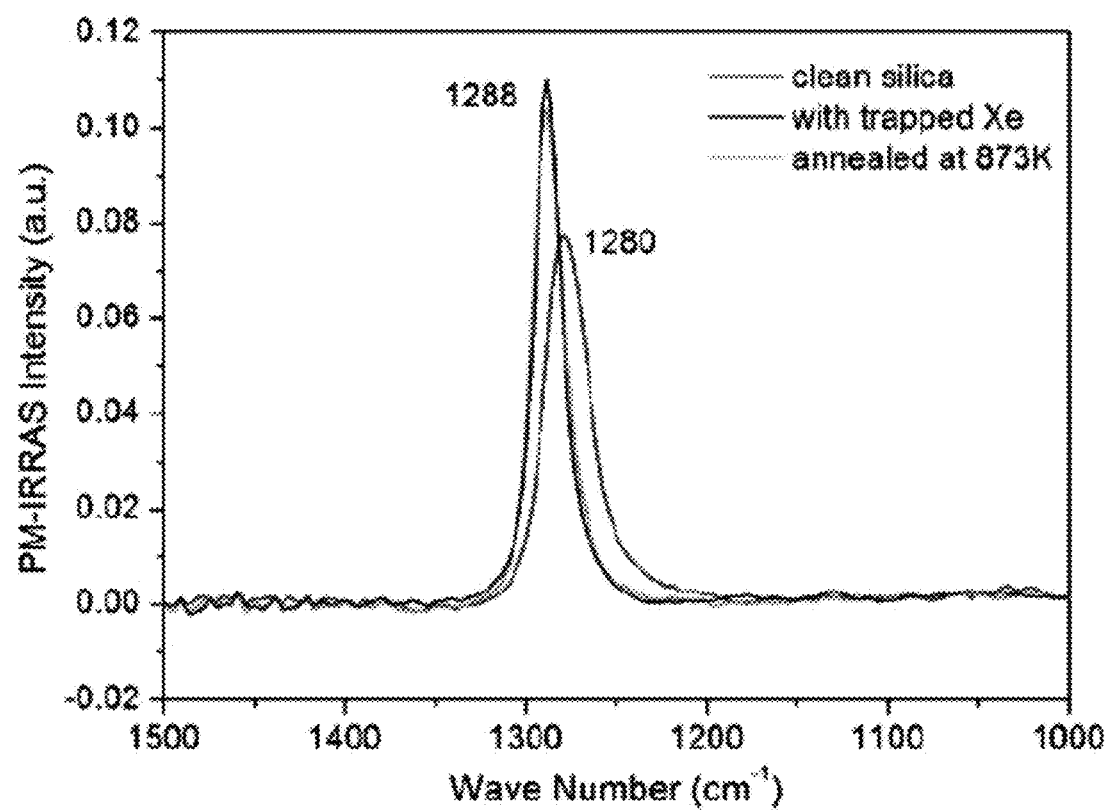
FIG. 13 is a graph of PM-IRRAS of clean silica bilayer and xenon trapped silica bilayer.

DFT calculations are carried out to study the structures and energetics of noble gases (Ar, Kr, Xe, and Rn) trapped in both silica (SiO$_2$) and aluminosilicate (H$_{0.125}$Al$_{0.375}$Si$_{0.625}$O$_2$) frameworks. Silica films on p(2×1)-O/Ru(0001) and aluminosilicate films on Ru(0001) with Θ=0.25 and 0.5 are modeled. The structural changes of the frameworks upon noble gas trapped inside nanocages are quantified by monitoring changes in the film thickness and nanocage sizes in silica (FIGS. 11A-I) and aluminosilicate films (FIGS. 12A-I). In order to characterize the structural deformation of the framework upon trapping the noble gases, three different oxygen locations of the framework shown in the side view in FIG. 1B in the direction normal to the surface are distinguished: a) oxygen at the bottom (closest to ruthenium, $O_b$), b) oxygen in the middle ($O_m$), and c) oxygen at the top (furthest from ruthenium, $O_t$). The major changes are found in the $O_m$—$O_m$ distances between oxygen atoms at opposite sides of the cage (d($O_m$—$O_m$)), due to the expansion of the nanocages. Taking Θ=0.5 as an example, d($O_m$—$O_m$) increases by 0.05 Å (Ar), 0.08 Å (Kr), 0.14 Å (Xe), and 0.17 Å (Rn) in $SiO_2$ and 0.08 Å (Ar), 0.10 Å (Kr), 0.17 Å (Xe), and 0.20 Å (Rn) in $H_{0.125}Al_{0.375}Si_{0.625}O_2$. The distortion of the cages could potentially induce shifts in the vibrational phonon modes of the structure, as obtained by infrared reflection absorption spectroscopy (IRRAS). The most characteristic mode is associated with the vertical motion of the oxygen atoms linking the two layers in the bilayer structure, which for the case of $SiO_2$ is located at ≈1300 $cm^{-1}$. Another phonon mode was reported for this bilayer structure at ≈690 $cm^{-1}$. However, as the instrument used for the experiment has a lower wavelength cutoff at 800 $cm^{-1}$, it renders this lower frequency mode inaccessible in the experiments. Previous work did not show any visible shift on the 1300 $cm^{-1}$ mode upon Ar inclusion due to the negligible distortion of the bilayer upon Ar intake. Upon Xe trapping, however, there is an 8 $cm^{-1}$ redshift in the signature interlayer phonon mode in IRRAS as shown in FIG. 13, which shows the polarization modulation infrared reflectance absorption spectroscopy (PM-IRRAS) of the clean silica bilayer (black), Xe trapped silica bilayer (blue) and high temperature annealed silica bilayer (green). This could be explained by the distortion of the bilayer where d($O_m$—$O_m$) increases by 0.14 Å and the film thickness ($d_z(O_t$—$O_b)$) increases by 0.01 Å at $\Theta_{xe}$=0.5 (FIGS. 11F-G). The redshift is accompanied by a large broadening of the phonon peak with the full width at half maximum changing from 10.2 to 14.4 $cm^{-1}$. This shift and broadening are reversible as Xe desorbs upon heating the sample to 873 K.

The adsorption energies ($\Delta E_{ads}$) are calculated for gas atoms adsorbed outside the nanocage, $\Delta E_{ads}=E_{sub+gas}*-(E_{sub}+E_{gas})$, where $E_{sub+Egas}*$, $E_{sub}*$ and $E_{gas}$ are the total energies for the adsorbed system (gas*-(alumino)silicate/O/Ru(0001)) and noninteracting individual components ((alumino)silicate/O/Ru(0001) and isolated gas atoms). Consistent with $\Delta E_{ads}$ in the order of ≈100 meV for noble gas atoms adsorbed on the Pd(111) surface, the calculated $\Delta E_{ads}$ is −0.16 eV (Ar), −0.19 eV (Kr), −0.24 eV (Xe), and −0.29 eV (Rn) for SiO 2 and −0.15 eV (Ar), −0.17 eV (Kr), −0.18 eV (Xe), and −0.18 eV (Rn) for $H_{0.125}Al_{0.375}Si_{0.625}O_2$ (FIGS. 14A-C).

Figure 14A:
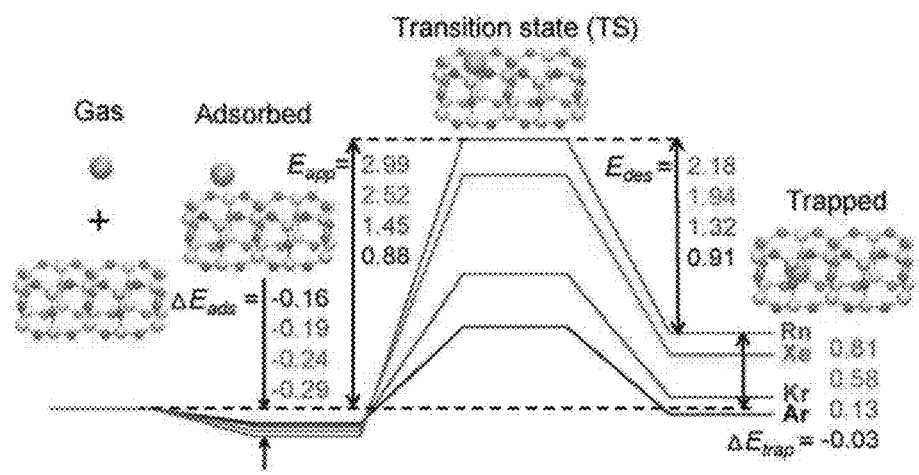
FIGS. 14A-C are potential energy diagrams for trapping of noble gases (argon, krypton, xenon, and radon) in silica (14A) and aluminosilicate and for constrained DFT calculations for neutral argon atom trapped inside a silica nanocage (14C).
Figure 14B:
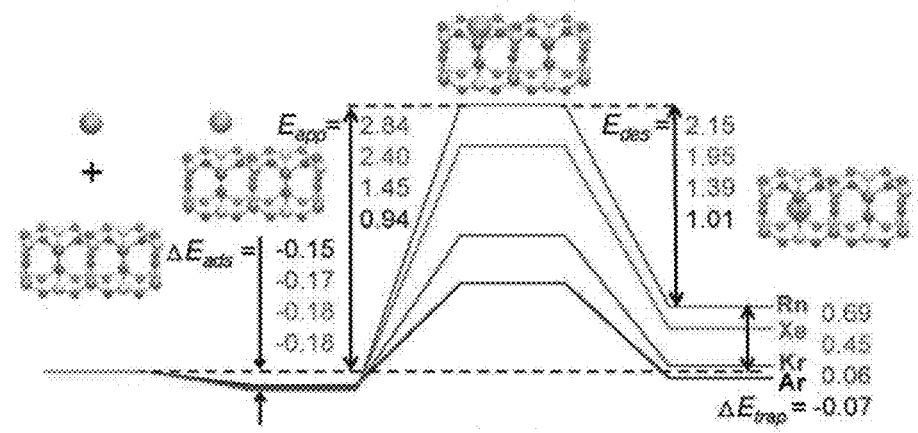
Figure 14C:
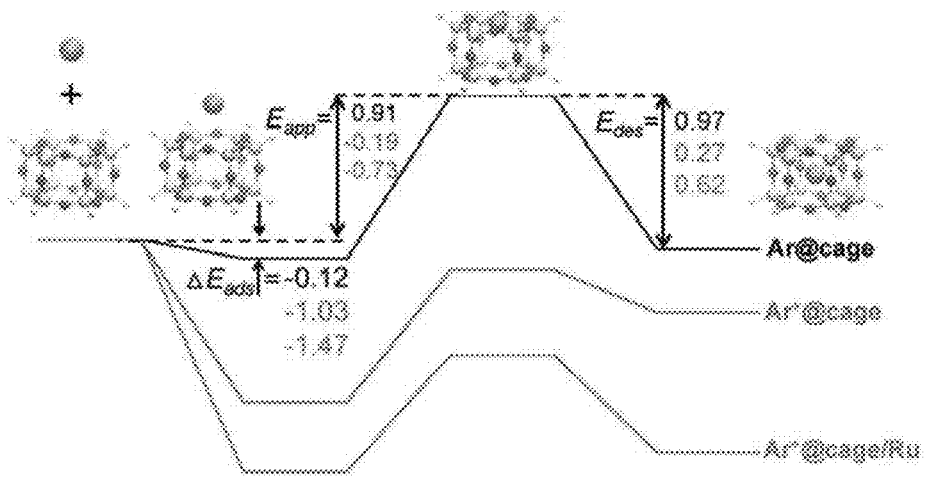

FIGS. 14A-C show the potential energy diagram for the noble gas trapping. Potential energy diagram for Ar (black line), Kr (blue line), Xe (red line), and Rn (violet line) atoms being trapped in the silica (FIG. 14A) and aluminosilicate (FIG. 14B) bilayer film at Θ=0.25. Color code: Ar (black), Kr (blue), Xe (red), and Rn (violet). FIG. 14C shows the potential energy diagram from constrained DFT calculations for a neutral Ar atom trapped inside a single freestanding silica nanocage terminated with H atoms (black line), Ar+ trapped inside a single freestanding silica nanocage (green line), and Ar+ trapping in a silica nanocage adsorbed on Ru surface (magenta line). Colors of energies correspond to colors of Ar@cage (black), Ar+@cage (green), and Ar+@cage/Ru (magenta). $\Delta E_{ads}$, and $\Delta E_{trap}$ (in eV) represent the adsorption energy outside the nanocage and trapping energy inside the nanocage. $E_{app}$ and $E_{des}$ (in eV) represent the apparent trapping and desorption energy barriers.

Due to the weak vdW interaction, noble gas atoms adsorbed outside the nanocages are not stable at noncryogenic conditions and can easily desorb at room temperature. Noble gas atoms can be trapped inside the (alumino)silicate nanocage or at the silica/Ru(0001) interface. Trapping energies ($\Delta E_{trap}$) are calculated from the relaxed structures of the (alumino)silicates before and after the noble gas trapping, $\Delta E_{trap}=E_{sub+gas(trap)}-(E_{sub}+E_{gas})$, where $E_{sub+gas(trap)}$, $E_{sub}$, and $E_{gas}$, are the total energies for (alumino)silicate/O/Ru (0001) with and without trapped gas, and isolated gas atoms, respectively. The calculated $\Delta E_{trap}$ are summarized in FIGS. 14A-C and Table 2, and the corresponding structures are summarized in FIGS. 11A-I and 12A-I.

For the noble gas atoms trapped in the nanocages at Θ=0.25, $\Delta E_{trap}$ is −0.03 eV (Ar), 0.13 eV (Kr), 0.58 eV (Xe), and 0.81 eV (Rn) for $SiO_2$ and −0.07 eV (Ar), 0.06 eV (Kr}, 0.45 eV (Xe), and 0.69 eV (Rn) for $H_{0.125}Al_{0.375}Si_{0.625}O_2$. Unlike trapped Ar, significantly large positive trapping energies of Xe and Rn in both cases indicate that these trapped Xe and Rn are thermodynamically unstable, because the vdW diameters of Xe and Rn are >1 Å larger than the size of the nanocage, which also leads to larger trapping and desorption barriers than Ar and Kr.

Structures corresponding to noble gas atoms trapped at the silica/Ru(0001) interface are also studied. Compared to $\Delta E_{trap}$ of atoms in the nanocages, noble gas atoms trapped at the interface are energetically less favorable, which is partially due to the energy penalty associated with pushing the silica bilayer away from the substrate (FIGS. 15A-G). DFT results on the vertical displacement of the silica bilayer from the metallic support by CO molecules were also reported by others. The results suggest that the nanocages in the (alumino)silicate frameworks are the trapping sites over the interface, which is consistent with XPS results where the main peak is assigned to the noble gas atoms trapped in the nanocages.

Figure 15A:
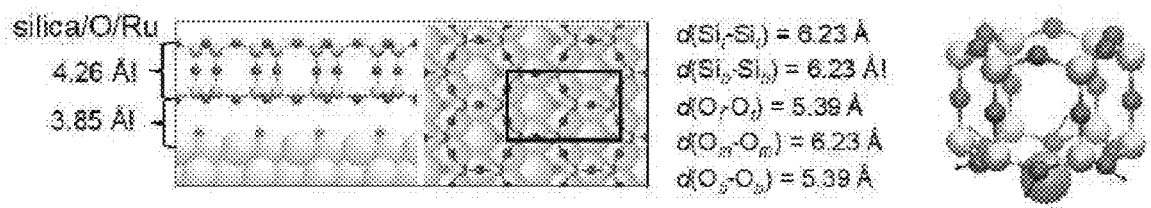
FIGS. 15A-G are side and top views of an adsorbed 2D-silica bilayer (15A) and side and top views of argon, krypton, and xenon (15B-C, D-E, and F-G, respectively) trapped at the $(SiO_2)$/O/Ru(0001) interface at Θ=0.25 and 0.5, respectively.
Figure 15B:
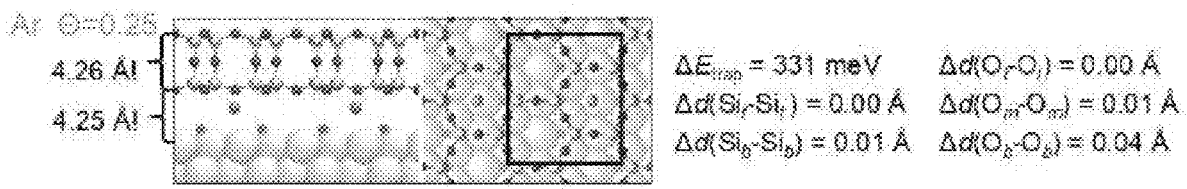
Figure 15C:
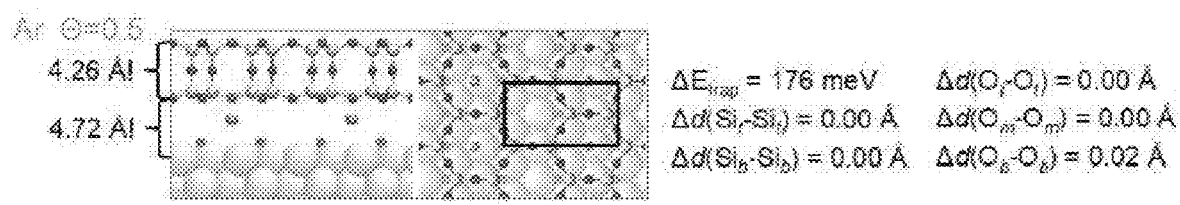
Figure 15D:
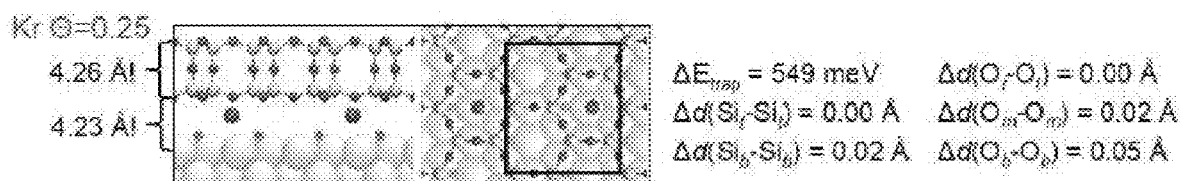
Figure 15E:
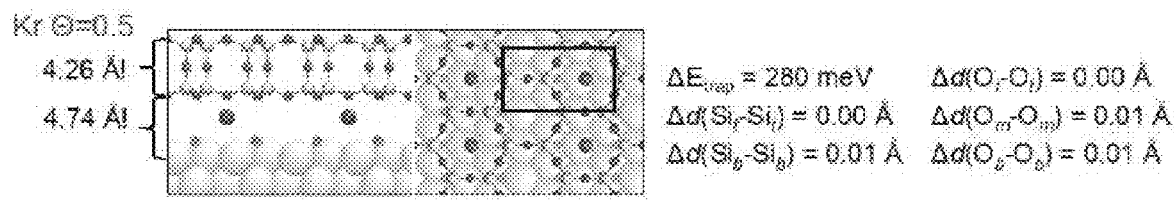
Figure 15F:
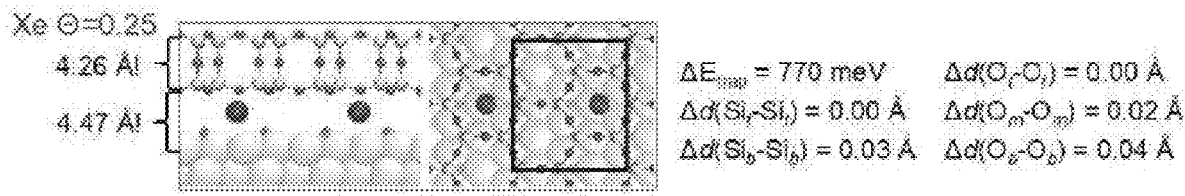
Figure 15G:
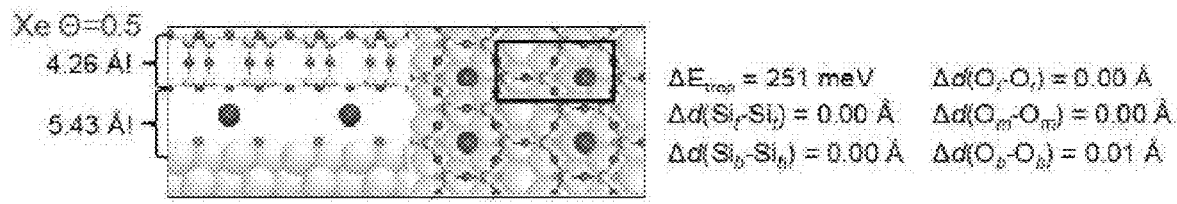

FIGS. 15A-G show side and top views of Ar, Kr and Xe atoms trapped at the ($SiO_2$)/O/Ru(0001) interface. FIG. 15A is a side and top view of the 2D silica bilayer adsorbed on p(2×1)-O/Ru(0001) [i.e., $(SiO_2)_8$/40/Ru(0001)]. Black rectangle indicates the unit cell. Pore sizes are shown on the right panel, which are characterized as the averaged Si—Si distance in the top layer d($Si_t$—$Si_t$), Si—Si distance in the bottom layer d($Si_b$—$Si_b$), O—O distance in the top layer d($O_t$—$O_t$), O—O distance in the middle layer d($O_m$—$O_m$) and O—O distance in the bottom layer d($O_b$—$O_b$). FIGS. 15B-C show Ar—($SiO_2$)/O/Ru(0001) at Θ=0.25 and Θ=0.5. FIGS. 15D-E show Kr—($SiO_2$)/O/Ru(0001) at Θ=0.25 and Θ=0.5. FIGS. 15F-G show Xe—($SiO_2$)/O/Ru(0001) at Θ=0.25 and Θ=0.5. Distances on the left correspond to the thickness of the silica film ($d_z(O_t$—$O_b)$) and the interface distance ($d_z(Ru$—$O_b)$). $\Delta E_{trap}$ and changes in d($Si_t$—$Si_t$), d($Si_b$—$Si_b$), d($O_t$—$O_t$), d($O_m$—$O_m$) and d($O_b$—$O_b$) and are shown on the right panel in FIGS. 15B-G. Color code: Ar (cyan), Kr (purple), Xe (blue), Ru (silver), Si (yellow), O in the silica film (red) and O chemisorbed on Ru (pink).

TABLE 2

| | $\Delta E_{ads}$/eV | $\Delta E_{trap}$/eV | $E_{app}$/eV | $E_{des}$/eV |
|---|---|---|---|---|
| Ar@silica/Ru | −0.16 | −0.03 | 0.88 | 0.91 |
| Kr@silica/Ru | −0.19 | 0.13 | 1.45 | 1.32 |
| Xe@silica/Ru | −0.24 | 0.58 | 2.52 | 1.94 |
| Rn@silica/Ru | −0.29 | 0.81 | 2.99 | 2.18 |
| Ar@aluminosilicate/Ru | −0.15 | −0.07 | 0.94 | 1.01 |
| Kr@aluminosilicate/Ru | −0.17 | 0.06 | 1.45 | 1.39 |
| Xe@aluminosilicate/Ru | −0.18 | 0.45 | 2.40 | 1.95 |
| Rn@aluminosilicate/Ru | −0.18 | 0.69 | 2.84 | 2.15 |
| Ar@silica cage | −0.12 | −0.06 | 0.91 | 0.97 |
| Ar⁺@silica cage | −1.03 | −0.46 | −0.19 | 0.27 |
| Ar⁺@silica cage/Ru | −1.47 | −1.35 | −0.73 | 0.62 |

Adsorption energy (and desorption energy barrier ($E_{des}$) for Ar, Kr, Xe and Rn in (alumino)silicate films and Ar and Ar⁺ in silica nano-cages.

Trapping Mechanism

Figure 16A:
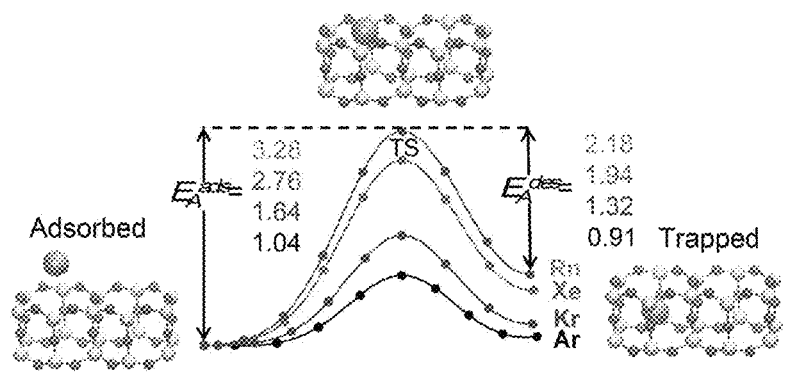
FIGS. 16A-D are graphs of the minimum energy path for noble gas (argon, krypton, xenon, and radon) atoms at Θ=0.25 trapped in $SiO_2$ (16A) and $H_{0.125}Al_{0.375}Si_{0.625}O_2$ (16B), and at Θ=0.5 in $SiO_2$ (16C) and $H_{0.125}Al_{0.375}Si_{0.625}O_2$ (16D).
Figure 16B:
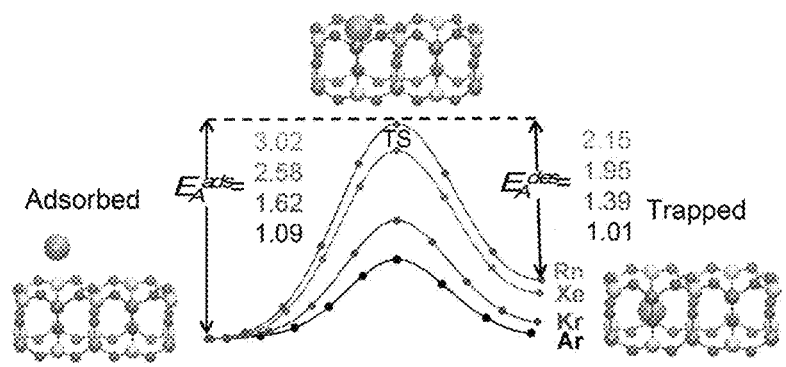
Figure 16C:
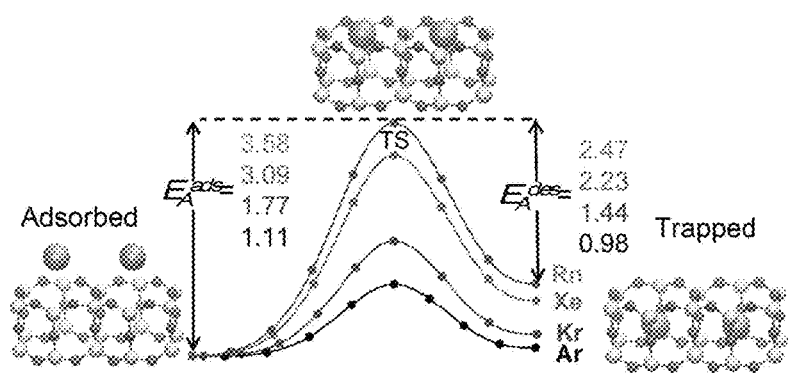
Figure 16D:
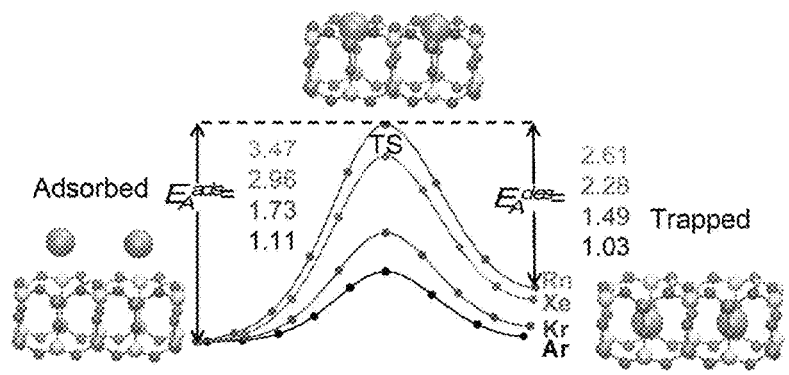

The energetics of the noble gas trapping pathway can be calculated from DFT using the climbing image nudged elastic band (CI-NEB) method for neutral noble gas atoms, including the initial state before adsorption, adsorbed states, transition states (TS), and trapped states. The minimum energy pathways are shown in FIGS. 16A-D for $\Theta=0.25$ and $\Theta=0.5$. FIGS. 16A-D show the minimum energy path for noble gas trapping as obtained from climbing image nudged elastic band calculations when all of the Ar (black), Kr (blue), Xe (red) and Rn (violet) atoms at $\Theta=0.25$ are trapped simultaneously in $SiO_2$ (FIG. 16A) and $H_{0.125}Al_{0.375}Si_{0.625}O_2$ (FIG. 16B) and at $\Theta=0.5$ in $SiO_2$ (FIG. 16C) and $H_{0.125}Al_{0.375}Si_{0.625}O_2$ (FIG. 16D).

In particular, the apparent activation energy barriers is focused on for noble gas trapping ($E_{app}$) and desorption ($E_{des}$), where $E_{app}$ ($E_{des}$) is the energy difference between the transition state and the initial state before adsorption (the trapped state). In order to enter or escape from the nanocages, noble gases overcome these barriers, as shown in FIG. 14A and Table 2. At the transition state, the nanocage in the silica framework expands substantially to allow noble gas atoms to enter. The calculated $E_{app}$ ($E_{des}$) are 0.88 (0.91), 1.45 (1.32), 2.52 (1.94), and 2.99 (2.18) eV for Ar, Kr, Xe, and Rn trapped in the silica framework at $\Theta=0.25$, respectively. Such high activation energies for trapping and desorption can result from the deformation energy of the hexagonal prisms at the transition state. As shown in FIG. 14B, $E_{des}$(aluminosilicate) is larger than $E_{des}$(silica), which is consistent with a higher desorption temperature from the aluminosilicate film (FIGS. 10A-F). The aluminosilicate film also has a smaller $\Delta E_{trap}$ (FIG. 14B), which is related to a more stable trapped state. This can be understood as a result of longer Al—O bonds as compared to the Si—O bonds, which leads to larger film thickness ($d_z$ ($O_1$—$O_b$)) and less energetic penalty to distort O—Al—O angles as compared to O—Si—O angles. For example, $d(O_1$—$O_b)$ of the $SiO_2$ film is 4.26 Å, which increases to 4.51 Å in $H_{0.125}Al_{0.375}Si_{0.625}O_2$, creating a less confined space.

Evidence from both experiment and theory suggests that the ultrahigh $E_{des}$ (about 1-2 eV) contributes to the noble gas atoms being trapped in nanocages at noncryogenic temperatures. Noble gas atoms must overcome the large $E_{app}$ (about 1-3 eV) to enter the nanocages. This is partly explained by the reduced size of noble gas atoms that are ionized in the gas phase to form cations. DFT is first used to investigate the energy pathway of rare gas ions trapped in 2D silica and show that noble gas cations experience significantly lower $E_{app}$ than neutral atoms, which facilitates the trapping process. Experimental evidence confirms that noble gas atoms are ionized by X-ray during the AP-XPS measurements before entering the nanocage.

The factors of electrostatic forces and Pauli repulsion can influence the trapping of noble gas cations. First, the electrostatic forces from the induced charges on the (alumino) silica bilayer and the image charges from the Ru substrate can pull the noble gas cation toward the nanocages, which effectively lowers $E_{app}$. Second, since a cation is smaller than the neutral atom, the energy cost of the cation to stretch the mouth (or opening) of the cage in the transition state is lower than that of the neutral atom, due to a weaker Pauli repulsion. To provide a quantitative assessment, the energetics of Ar+ trapping pathway in a silica nanocage are calculated using constrained DFT, where the silica bilayer is approximated by an isolated hexagonal nanocage terminated with H atoms and a positive charge is constrained on Ar+. This model can include naturally the effects of the polarization energy from the silica film and the Pauli repulsion between Ar+ and the nanocage. The image potential of the Ru substrate is included separately using the following equation.

$$U_{im} = -\frac{\varepsilon^2}{16\pi\varepsilon_0|z - z_{im}|} \quad \text{(Equation 1)}$$

where z is the atom position of the transition state and $z_{im}=1.35$ Å is the image plane of the Ru.

As shown in FIG. 14C, the minimum energy path for a neutral Ar atom (the black curve) to enter an isolated hexagonal nanocage is nearly the same as the extended bilayer system adsorbed on the Ru(0001) surface (FIG. 14A), with a slightly larger $E_{app}$ by 0.03 eV (FIG. 14C). The green curve in FIG. 14C represents the potential energy for Ar+ trapping in a single silica cage from constrained DFT calculations. Compared with the $\Delta E_{ads}=-0.12$ eV of the neutral Ar in the adsorbed state outside the nanocage, $\Delta E_{ads}$ for Ar+ is $-1.03$ eV, which is 0.91 eV lower in energy due to charge-induced charge attraction. After taking into account the polarization energy from the nanocage and smaller Ar+ size, $E_{app}$ of Ar+ drops to $-0.19$ eV. Once the image potential is included (magenta curve in FIG. 14C), $E_{app}$ further drops to $-0.73$ eV. Overall, the ionization can lower $E_{app}$ by 1.64 eV as compared to that of the neutral atom (0.91 eV) and makes the trapping of Ar+ feasible at room temperature.

Figure 17A:
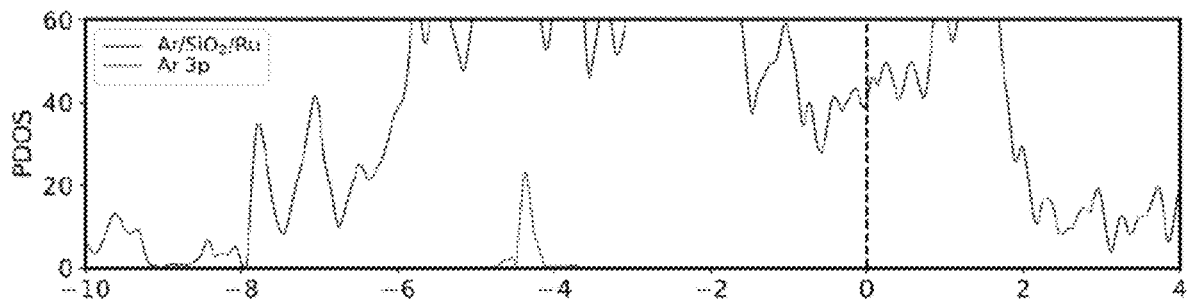
FIGS. 17A-B are graphs of projected density of states of Ar/$SiO_2$/Ru (black) and Ar 3p states (red) for Ar at the initial state (17A) and transition state (17B).
Figure 17B:
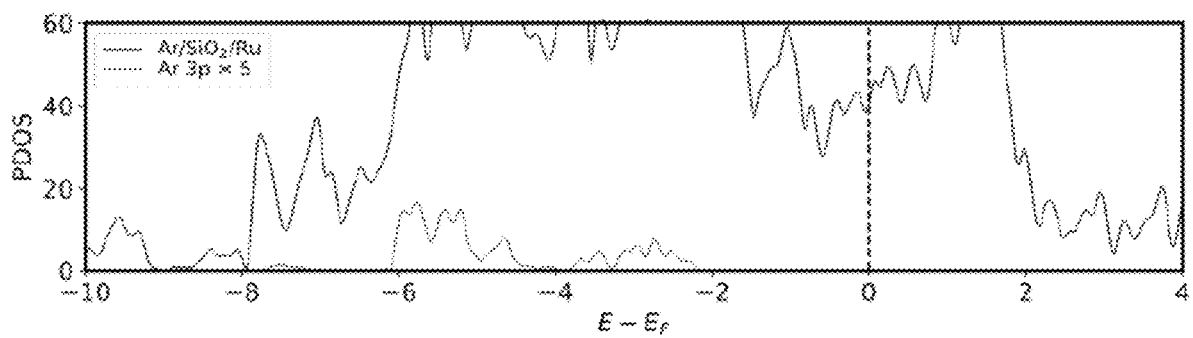

If Ar+ at the adsorbed state is neutralized by the silica/Ru heterojunction, $E_{app}$ is restored to that of the neutral atom, unless Ar is ionized again. As shown in FIG. 17A, the Ar 3p state is located at eV below the Fermi level ($E_F$) when Ar is adsorbed outside the nanocage. At the transition state, Ar 3p peak is broadened due to the hybridization with the nearby O atoms from the silica nanocage and the highest occupied molecular orbital (HOMO) of Ar is closer to $E_F$ (FIGS. 17A-B). FIGS. 17A-B show the projected density of states of Ar/$SiO_2$/Ru (black) and Ar 3p states (red) for Ar at the initial state (FIG. 17A) and transition state (FIG. 17B). Therefore, there is an increasing probability of the charge transfer from (alumino)silicate/Ru(1000) to Ar+ through resonant tunneling as Ar+ is pulled toward the nanocage by electrostatic forces.

Figure 18A:
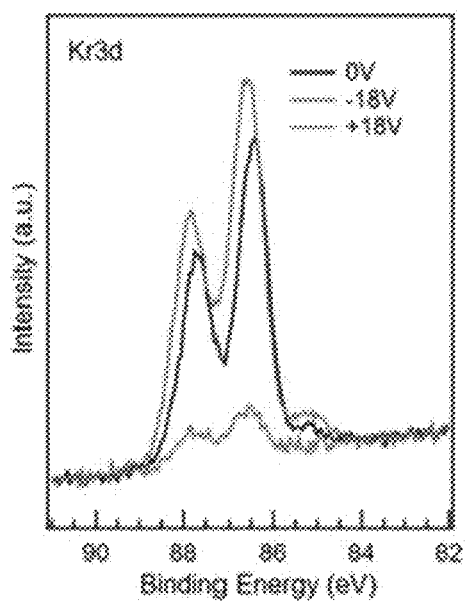
FIGS. 18A-B are graphs showing sample bias-dependent noble gas trapping behavior for a silica bilayer exposed to 2 mbar krypton for 10 minutes with 0 V (black), −18 V (red), and =18 V (green) in the presence of an X-ray beam (18A) and a silica bilayer in the presence (red) and absence (black) of an X-ray beam (18B).
Figure 18B:
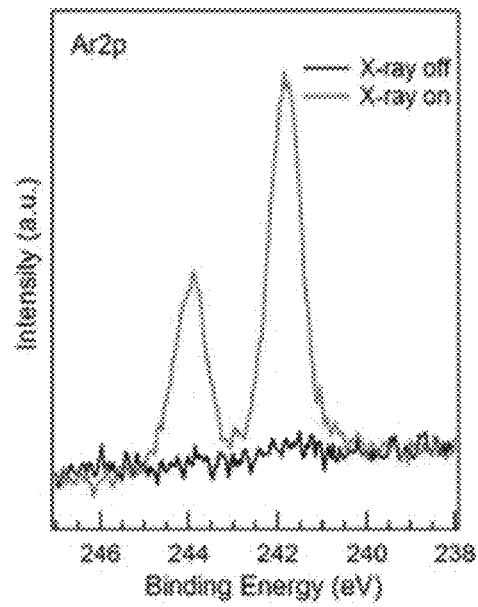

In order to experimentally prove the hypothesis of the cationic nature of the noble gas species entering the nanocage, a silica bilayer was exposed to 2 mbar of Kr while biasing the sample to either attract the cations ($-18$ V) or repel them ($+18$ V). The results are shown in FIG. 18A, where $-18$ V bias results in a slight increase in the coverage of Kr, while $+18$ V bias results in a drastic decrease of the population of trapped Kr. These results provide evidence supporting the model that the noble gas enters the nanocage in its cationic form. It is worth noting that, while in the case described above the noble gases are ionized by the synchrotron X-rays, no trapping is observed in a control experiment in the absence of X-rays (FIG. 18B). The ionization could be achieved in other less demanding methods without X-rays, including, for example, subjecting the gas to a strong electric field. For example, the Xe trapping shown in FIG. 8 was achieved by ionizing Xe by means of an electric field, using a sputter ion gun to generate ions without accelerating them toward the surface. In that experiment, the sample was not in line of sight with the sputter gun. Another relevant instance is with respect to nuclear power plants where gas atoms can be inherently exposed to ionizing radiation.

FIGS. 18A-B show sample bias-dependent noble gas trapping behavior proving the cationic nature of the noble gas species entering the nanocages. In FIG. 18A, the silica bilayer was exposed to 2 mbar Kr for 10 minutes with 0 V (black). −18 V (red), and +18 V (green) sample basis, respectively, in the presence of an X-ray beam. The spectra were acquired under UHV conditions after evacuating the gas (hv=400 eV). FIG. 18B shows the effect of the X-ray beam on the ionization and trapping process. The silica bilayer was exposed to 2 mbar Ar for 10 minutes in the presence (red) and absence (black) of an X-ray beam. The spectra were acquired under UHV conditions after evacuating the gas (hv=650 eV).

Desorption Mechanism

Upon entering the cage, the cation can be neutralized due to the electron transfer from the (alumino)silicate/Ru heterojunction. Even in the case, the noble gas atom is ionized again on the now inside of the cage as part of the XPS measurement, typical lifetimes of the charged state are in the order of $10^{-15}$ s, much faster that the nuclear motion needed for desorption. Therefore, the atoms must desorb in the neutral state. The noble gas atoms at the interface are less stable than those in the nanocages and can desorb through the grain boundaries at low temperatures from silica, as described later in FIGS. 10A-F. For example, from 298 to 373 K, the amount of trapped Kr decreases by 20% on the silica bilayer while there is almost no Kr desorption from the aluminosilicate bilayer, because there are no interfacial Ar, Kr, or Xe atoms at the aluminosilicate/Ru interface. The release temperature is defined as the temperature with the highest desorption rate (Table 3), which is equivalent to the peak temperature in temperature programmed desorption (TPD) spectra. The release temperature from the silica framework for Ar, Kr, and Xe are 373, 473, and 623 K, respectively (FIGS. 10A-C). The desorption temperatures increase to 498 K for Kr and to 673 K for Xe in the aluminosilicate (FIGS. 10E-F). This report of Xe atoms trapped in the nanocages up to 673 K constitutes a stable case of noble gas atoms in confinement.

Since gas atoms are neutralized after entering the nanocages, the $E_{des}$ from DFT is compared with that obtained from the desorption experiment (FIG. 10A-F). In order to obtain $E_{des}$ from the experiment, the first-order reaction law $\Theta=\Theta_0 \exp(-kt)$ was used, where $\Theta_0$ was taken from the first XPS data point at 298 K. The desorption rate constants (k) were calculated using the Arrhenius equation $$k = A \exp(-E_{des}/k_B T) \quad \text{(Equation 2)},$$

where A, $k_B$, and T are the pre-exponential factors calculated from the transition state theory, the Boltzmann constant, and the temperature. In order to obtain good fittings for $\Theta(t, T)$, a distribution of $E_{des}$ is expected, as labeled in FIGS. 10A-F (E1, E2, and E3). Three $E_{des}$ from the experiment with different coverage ($\Theta_{E1}$, $\Theta_{E2}$, and $\Theta_{E3}$) could be rationalized by the fact that there are possible inhomogeneities in the ring size distributions during the film synthesis, especially for the (alumino)silicate, as reported by Lichtenstein et al., and distortions of the hexagonal prism cages.

Figure 6A:
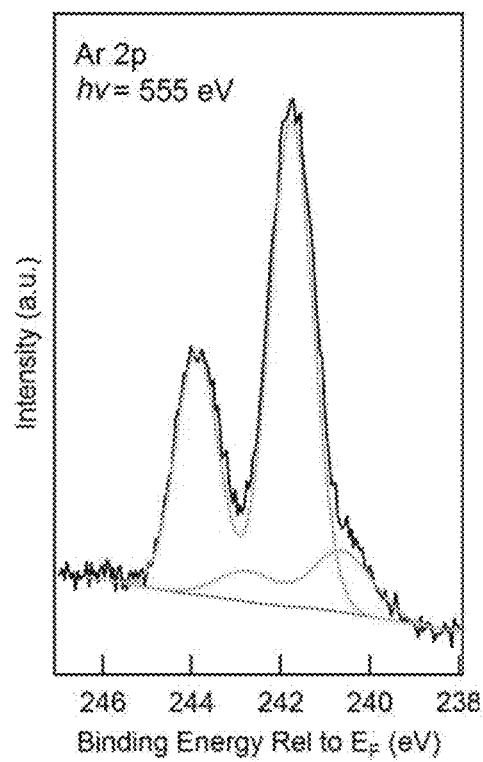
FIGS. 6A-C are graphs of UHV XPS spectra of trapped noble gas atoms (argon, krypton, and xenon, respectively) in 2D-silica bilayer.
Figure 6B:
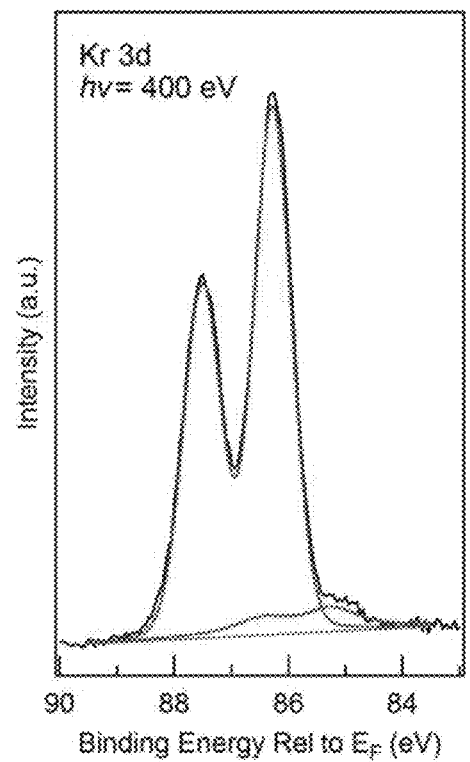
Figure 6C:
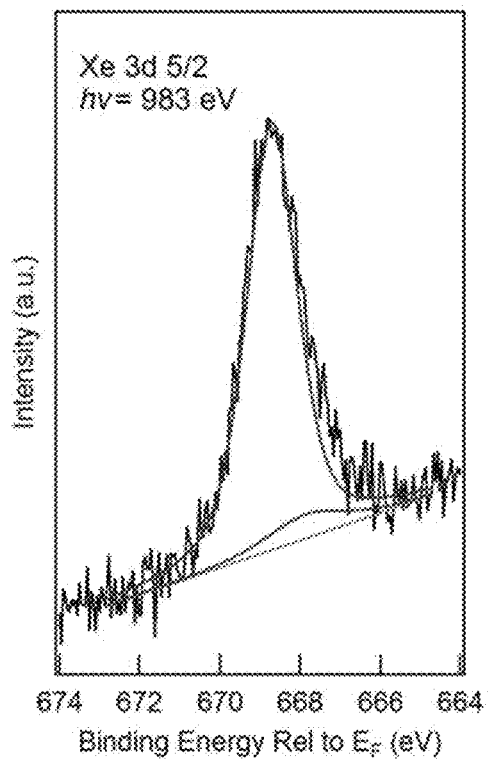
Figure 7A:
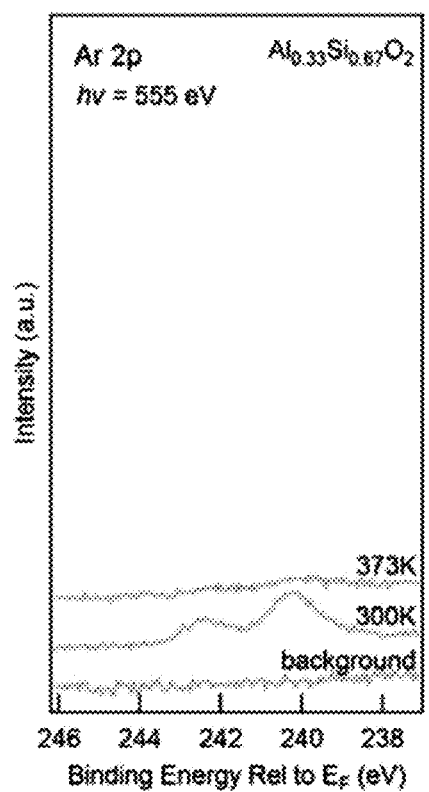
FIGS. 7A-C are graphs of UHV XPS spectra of trapped noble gas atoms (argon, krypton, and xenon, respectively) in an aluminosilicate bilayer as a function of temperature.
Figure 7B:
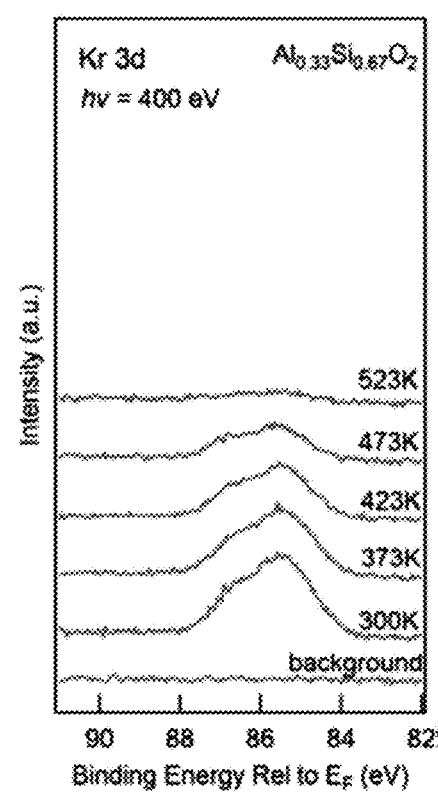
Figure 7C:
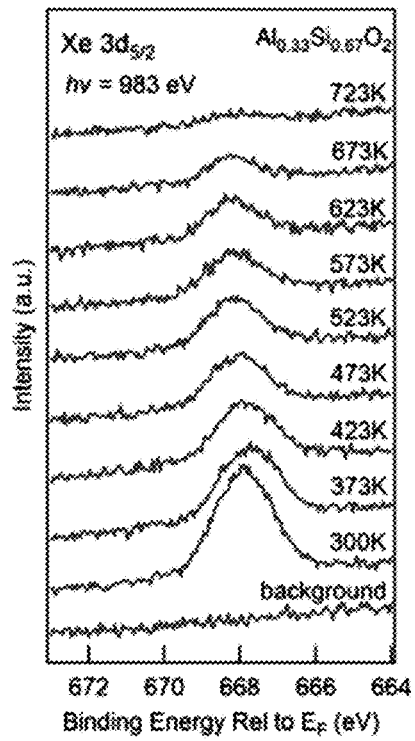

The $\Theta(t, T)$ curves (red curve in FIGS. 10A-F) with fitted $E_{des}$ ($E_1$, $E_2$, $E_3$) agree well with the experiments under an assumption of the error bar from XPS (±0.02 atoms per cage). The zero point energy (ZPE) corrected $E_{des}$ ($E_{des-DFT}$ from FIGS. 10A-F) is calculated to compare with the fitted $E_{des}$. The fitted $E_{des}$ with the highest composition ratio agrees well with the $E_{des-DFT}$ considering a reasonable error bar of DFT energy barriers (±0.1 eV), indicating that most of the noble gas atoms were trapped at the perfect hexagonal domains, and that it is the neutral gas atoms that are desorbed from the film. For example, in the desorption of Ar from a silica film (FIG. 10A), 44% of the Ar atoms are trapped in the hexagonal cages with the energy barrier $E_{des}(E_2)$=0.93 eV, which agrees well with $E_{des-DFT}$=0.92 eV from DFT calculations. $E_1$ and $E_3$ are within ≈±0.1 from $E_2$, likely corresponding to the Ar atoms trapped in other defect structures (e.g., distorted hexagonal prisms). The presence of the defect structures was observed in scanning tunneling microscopy (STM) images for the aluminosilicate film shown in FIG. 19, where 45% of the hexagonal cages were surrounded by six-membered rings while 55% of the hexagonal cages were surrounded by non-six-membered rings. The non-six-membered rings induce distortions in the hexagonal prism cages, which would explain changes in the activation energy for the release. Defect structures were also predicted by other calculations. It should be noted that in silica films (FIGS. 10A-C), the lowest fitted $E_{des}$ ($E_1$) contribute to 16% (Ar), 15% (Kr), and 19% (Xe) of the trapped atoms, which are comparable to the proportion of the noble gas atoms trapped at the interface of silica/Ru (0001) (FIG. 6A-C). Therefore, $E_{des}$ ($E_1$) in FIGS. 10A-C is

TABLE 3

| T(K) | Ar/SiO$_2$ | Ar/AlSiO$_2$ | Kr/SiO$_2$ | Kr/AlSiO$_2$ | Xe/SiO$_2$ | Xe/AlSiO$_2$ | Rn/SiO$_2$ | Rn/AlSiO$_2$ |
|---|---|---|---|---|---|---|---|---|
| 323 | 5.6 × 10$^{-5}$ | 7.2 × 10$^{-5}$ | — | — | — | — | — | — |
| 348 | 1.4 × 10$^{-4}$ | 2.4 × 10$^{-4}$ | — | — | — | — | — | — |
| 373 | 2.0 × 10$^{-4}$ | 2.2 × 10$^{-4}$ | 8.2 × 10$^{-6}$ | 1.8 × 10$^{-5}$ | — | — | — | — |
| 398 | — | — | — | 2.3 × 10$^{-5}$ | — | — | — | — |
| 423 | — | — | 6.1 × 10$^{-5}$ | 3.9 × 10$^{-5}$ | — | — | — | — |
| 448 | — | — | 1.5 × 10$^{-4}$ | 1.1 × 10$^{-4}$ | — | — | — | — |
| 473 | — | — | 4.6 × 10$^{-4}$ | 1.7 × 10$^{-4}$ | — | — | — | — |
| 498 | — | — | — | 3.2 × 10$^{-4}$ | — | — | — | — |
| 523 | — | — | — | 3.0 × 10$^{-4}$ | — | — | — | — |
| 573 | — | — | — | — | 2.3 × 10$^{-4}$ | 5.5 × 10$^{-5}$ | — | — |
| 623 | — | — | — | — | 8.5 × 10$^{-4}$ | 7.2 × 10$^{-5}$ | — | — |
| 673 | — | — | — | — | — | 2.6 × 10$^{-4}$ | — | — |
| 723 | — | — | — | — | — | 2.4 × 10$^{-4}$ | — | — |
| $E_{des}$(eV) | 0.92 | 1.03 | 1.33 | 1.40 | 1.95 | 1.96 | 2.19 | 2.16 |
| $\frac{\Delta S}{k_B}$ | −0.94 | −1.05 | −0.83 | −0.93 | −0.67 | −0.75 | −0.64 | −0.67 |

Desorption rate constants (/s) from XPS at different temperatures (K). DFT calculated desorption energy barriers ($E_{des}$) with ZPE correction from $\Theta$ = 0.25. $\Delta S$ is the entropy difference of the trapped ($S_{ini}$) and the transition state ($S_{ts}$).

assigned to the interfacial trapped noble gas atoms that are likely to desorb through the grain boundaries, which also explains the drop of O at the initial heating stages as discussed above, which is observed in silica, but not in the aluminosilicates.

Figure 19:
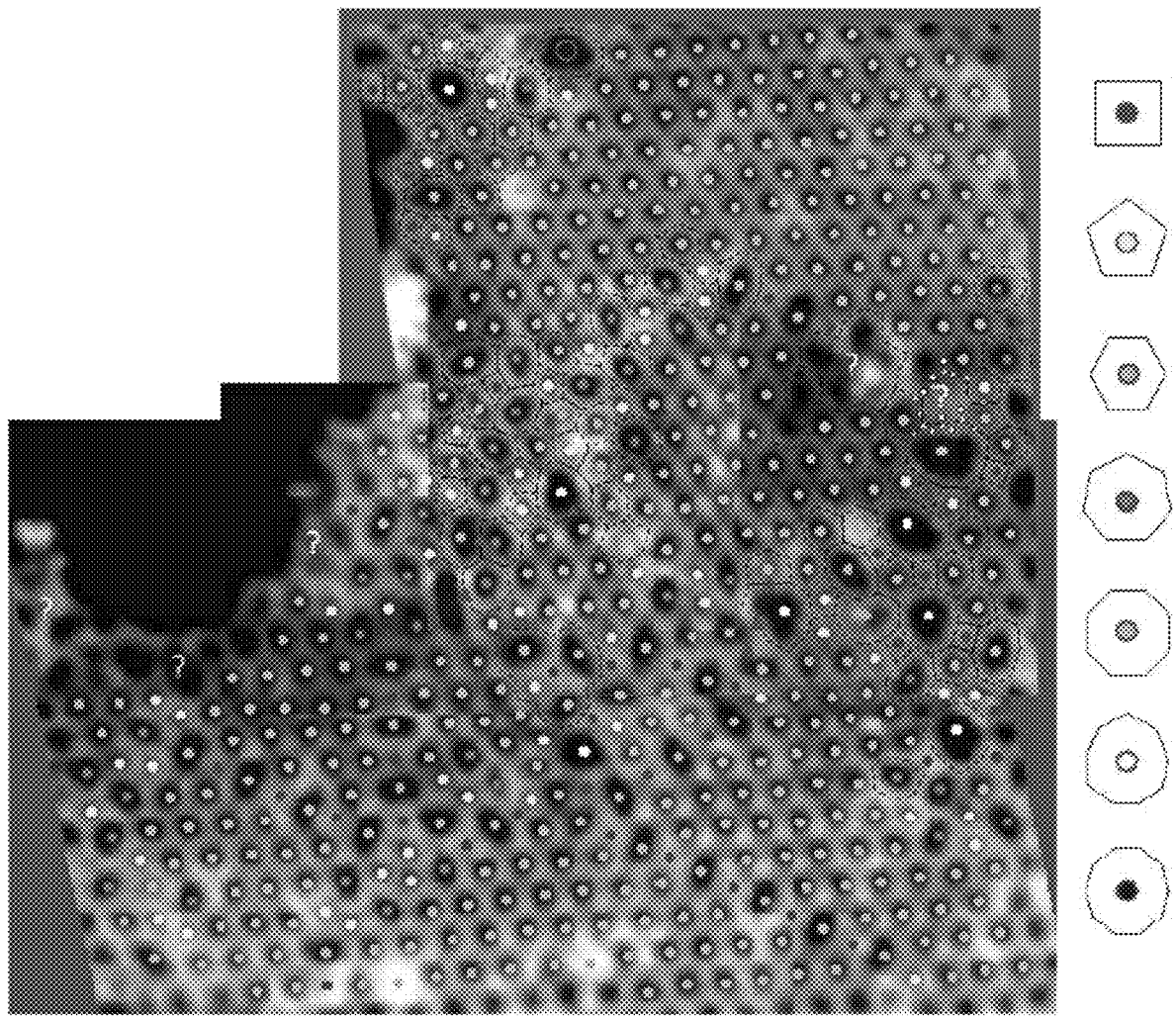
FIG. 19 is an STM image showing the morphology of the aluminosilicate film with a molar ratio of Al/Si=0.56.

FIG. 19 is an STM image showing the morphology of the aluminosilicate film with a molar ratio of Al/Si=0.56. Among the 335 six-member rings, 151 six-member rings (45%) are surrounded entirely by six-member rings while 184 six-member rings (55%) are surrounded partly or entirely by 4, 5, 7, 8, 9, or 10-member rings.

Separation of Noble Gases

Figure 20:
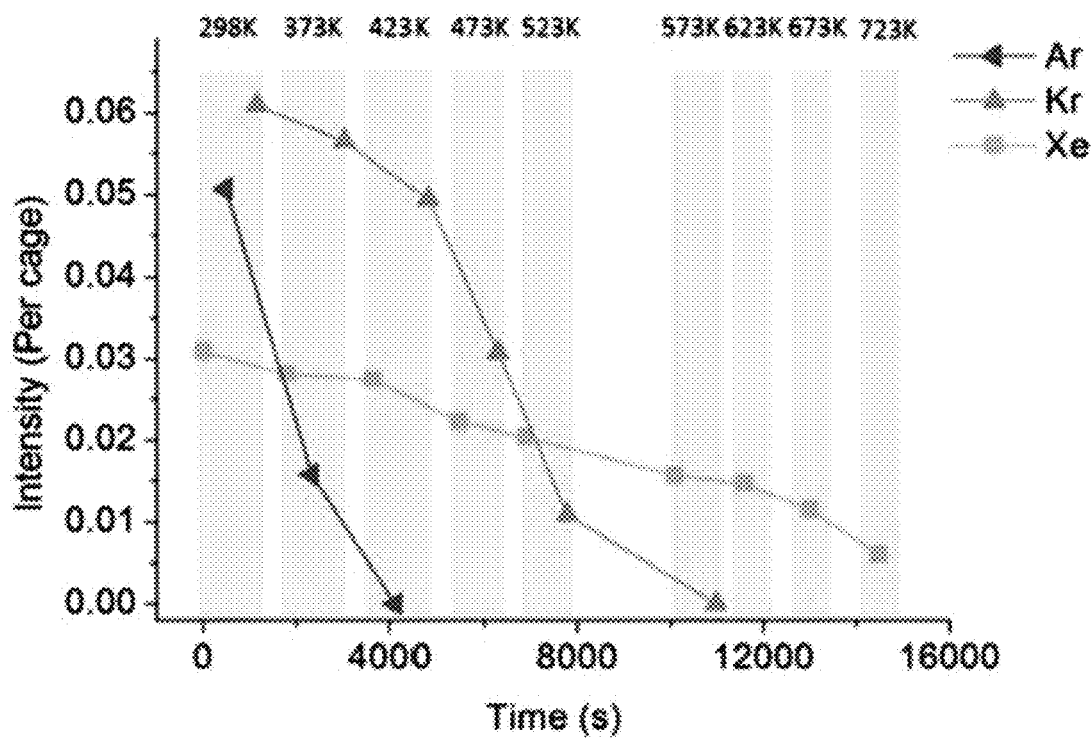
FIG. 20 is an XPS analysis of mixed noble gas atoms (argon, krypton, and xenon) trapped in a 2D aluminosilicate bilayer.
Figure 21:
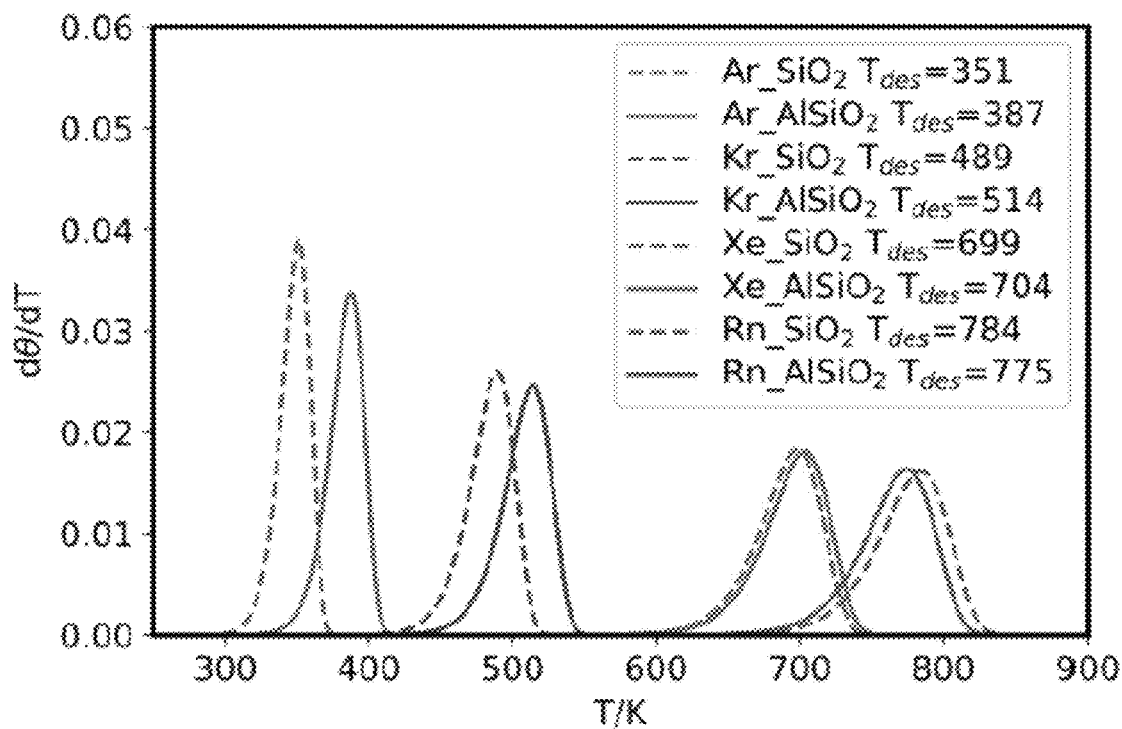
FIG. 21 is a simulated temperature programmed desorption curve for argon (green), krypton (blue), xenon (red) and radon (purple) in the silica (dashed) and aluminosilicate (solid) bilayer.

The ability to stabilize all noble gas atoms makes the present 2D materials not only an opportunity for fundamental studies of individual atoms in nanoconfinement, but also candidates for potential applications in noble gas storage and separation. Such potential is illustrated by trapping a mixture of Ar, Kr, and Xe in the cages of an aluminosilicate film at room temperature and subsequently releasing them at higher temperatures. Here, the aluminosilicate bilayer ($Al_{0.35}Si_{0.65}O_2$) is exposed to 2 mbar of an equimolar noble gas mixture at 300 K for 20 minutes, while measuring XPS. Atoms of the three gases are simultaneously trapped in the cages, as evidenced by XPS spectra taken after pumping out the gases. The sample is then heated while taking XPS spectra, and FIG. 20 shows a plot of the Ar, Kr, and Xe content as a function of temperature. FIG. 20 shows an XPS analysis of mixed noble gas atoms trapped in a 2D aluminosilicate ($Al_{0.35}Si_{0.65}O_2$) bilayer. All XPS data are collected under UHV conditions after 2 mbar exposure to a mixture of noble gases (nAr:nKr:nXe=1:1:1). The coverage (0) is calculated and displayed as a function of time and temperatures. Kr atoms have the highest initial coverage (i.e., 0.06 per nanocage), consistent with higher coverage seen in the single-component noble gas trapping experiments discussed above. By increasing the temperature to 423 K, all trapped Ar atoms are released from the aluminosilicate bilayer, while Kr and Xe have 81% and 89% left in the framework. These trapped Kr atoms can be completely or substantially removed from the film by further increasing the temperature to 573 K, where 51% of Xe atoms remain trapped in the framework. Simulated temperature programmed desorption curve for Ar (green), Kr (blue), Xe (red) and Rn (purple) in the silica (dashed) and aluminosilicate (solid) bilayer are shown in FIG. 21. The intensity from DFT are calculated based on the first order reaction law $I=I_0 \exp(-kt)$. The curves in FIG. 21 also illustrate the potential for separating different noble gases. The desorption rate constants (k) were calculated based on the Arrhenius equation $k=A \exp(-E_A^{des}/k_bT)$. The temperature is increased linearly with a rate of 0.33 K/s. Moreover, the 2D zeolite has a trapping capacity (9 wt % for Kr) comparable with other selective adsorbents like metal-organic frameworks (13 wt % for Kr). However, it should be noted that both the film quality and the ionization process are utilized for such separations.

Other Implications

The present findings provide insight into the "missing" Xe problem, suggesting that the low concentration of Xe in the atmosphere might result from Xe being trapped in, e.g., aluminosilicate minerals on the earth. An identical 2D aluminosilicate structure with hexagonal prism cages are found in nature, as a multilayer material called hexacelsian, with barium ions separating the layers. Hexacelsian can be thermodynamically stable, and can be synthesized by heating Ba-exchanged Zeolite A, an expensive zeolite, to high temperatures. The relatively low cost of producing the present synthetic hexacelsian can provide an opportunity for potential applications, including for example, the trapping and separation of gases discussed above, ultrathin corrosion resistant coatings, trapping of radioactive isotopes of noble gases, production of catalytically active 2D aluminosilicate nanosheets, or ultrathin membranes. The ability of the present nanoporous 2D materials to host noble gas atoms (and potentially other species) in cages and at the interface with the metal support, can offer possibilities for nanoscale confinement effects in chemical reactions.

Individual noble gas atoms (Ar, Kr, Xe, and Rn) can be trapped at 300 K in hexagonal prism nanocages (0.5 nm) of 2D silica and aluminosilicate by activated physisorption. Further, individual gas atoms can be studied under spatial confinement at high temperature, using surface science techniques. Additionally, applications in gas capture and separation, with implications for the environment and health, are envisioned. The trapping of noble gas atoms at noncryogenic temperature is detected in situ using XPS measurements and corroborated by DFT calculations. The noble gas atoms can enter the cages as cations and become neutralized by the substrate after being trapped. Larger atoms, are more stable in the cage, as evidenced by the higher desorption temperature and the higher activation energy for desorption. Furthermore, a mixture of noble gases can be trapped and then separated with the present material, for example, by taking advantage of their different desorption temperatures. The ionization-facilitated activated physisorption mechanism of the present invention may be used to manipulate and engineer molecule-surface interactions.

The present materials can be used to capture Kr and Xe off-gas from nuclear fission reactors. These materials can be adapted to current nuclear reactor technologies to improve efficiency and contribute to enabling new modular and cleaner technologies, such as molten salt reactors. Other materials being explored for solving these types of problems are metal organic frameworks (MOF). However, the silicate materials described herein also increase temperature stability and radiation stability under ionizing irradiation.

Products resulting from the present materials have utility in different areas. One area, for example, relates to reducing the pressure of fission gases by placing the gettering material at the point of generation in solid fuel elements (pins or annular geometry). This enables more compact fast reactor designs with several advantages.

Some short-lived radioactive isotopes of Xe are strong neutron absorbers, reducing the reactivity of nuclear reactors. Removing Xe can allow liquid fueled molten salt reactors to dynamically load follow. This characteristic can permit the integration of nuclear power in the electric grid with renewables.

Accelerator driven systems (ADS) with liquid molten salt fuel can desirably use technology appropriate for off-gas treatment. Decreasing the amount of Xe reduces reactivity swings in the reactor. In some instances, the ADS systems can remain subcritical. Therefore, managing off-gas could be a component of maintaining uniform, controllable and predictable reactivity. Another area is nuclear energy in which the present gettering materials can be useful for reprocessing nuclear waste.

Getter materials can reduce the amount of fission gases in the plenum region of a light water reactor fuel pin. Reducing the fission gas pressure in fuel pins enables increased fuel burnup and improve fuel utilization. This reduces the amount of radioactive unreacted fuel that needs to be disposed. Gettering Xe and Kr can also be considered for fast reactors with higher release of fission gasses and larger plenum volumes where an effective getter could allow a reduction in the plenum size with attendant cost advantages. These materials can reduce or eliminate the emission of radioactive Kr and Xe into the atmosphere.

The present materials can have improved thermal and structural stability due to their inorganic nature. The present materials offer an improvement in thermal and structural stability for trapping fission gases Kr and Xe. The single-layer silicate model systems that have been tested experimentally are stable up to 1230 K. The present materials for Kr and Xe off-gas trapping can be useful in field operations. The present materials can be used in the field of nuclear power to improve the efficiency and reliability of nuclear reactors and reduce nuclear waste and the emission of radioactive volatile species.

Figure 22:
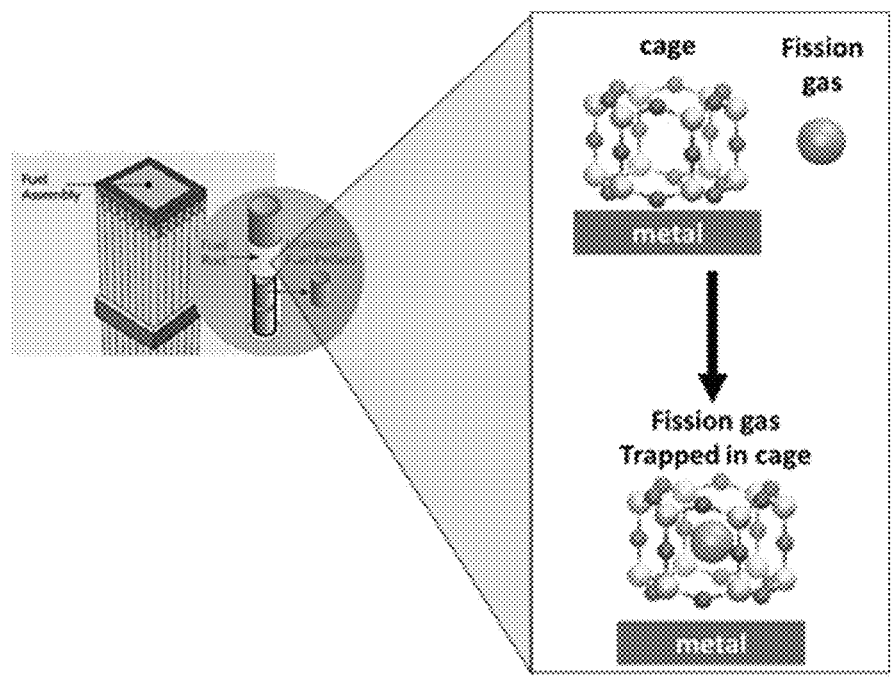
FIG. 22 is a schematic showing the use of a gettering material inside a fuel rod for trapping fission gases.

The present technology relates to trapping nuclear fission gases (specifically xenon and krypton). Technologies that efficiently and reliably capture Xe and Kr can be useful at different stages of the fuel cycle, potentially improving the efficiency of the nuclear reactor and facilitating other aspects of the fuel cycle. A schematic of the concept showing a fission gas atom getting trapped in a silica nanocage inside a fuel rod (one example of an application) is shown in FIG. 22 (a schematic showing the use of a gettering material inside a fuel rod for trapping fission gases). Preliminary data obtained using simple model materials shows the general viability of the present technology as a concept and potential for its scale-up.

Xenon and krypton are produced during nuclear fission inside of nuclear reactors. Given the gaseous nature of these elements, there can be an increase in pressure in the fuel pins which, in turn, can limit the lifetime and burnup of the fuel. Fission gas release from the fuel pellets is pronounced in high burnup fuel and is a function of (or a strong or direct function of) the fuel temperature. Plenum volumes can be small but, preliminary estimates indicate that the pressure reduction achieved by using a getter in the plenum could be as much as 295 psi for a boiling water reactor with burnup of 65 GWD/T and 460 psi for a pressurized water reactor with burnup of 100 GWD/T. In addition to the inefficiency in the process resulting from this, there can be environmental implications for the disposal of unused fuel. Furthermore, volatile radioactive isotopes of Xe and Kr can be trapped from radioactive nuclear waste.

The present noble gas trapping technology can trap Ar, Kr, and Xe, for example. The inorganic materials used in this technology can be structurally stable, made of earth-abundant elements (silicates) in contact with a metal support, and can withstand temperatures of up to 950° C. The noble gases can remain trapped in the material at elevated temperatures. The noble gases are trapped in polygonal prism silicate cages in contact with a metal where they can enter but cannot escape unless heated to high temperatures.

Materials

The gettering materials are produced by ALD deposition of hexagonal prism silsesquioxane on a high surface area metallic support. Some of the available high-surface area metallic supports are commercially available Ni foams. Given that in first preliminary tests using flat, low surface area model systems, Ru was the metallic support for the successful tests, a second class of samples are produced by the deposition of Ru thin films by ALD, prior to the deposition of the silsesquioxane. This allows for the comparison of the influence of the metal in gas trapping ability of the metal. The porous supports that are tested are Ni foams and SBA-15 mesoporous silicates. Fe and Co films are also tested as they can show a behavior similar to that of Ru, but their ALD precursors can be less expensive.

A candidate for the porous metal to use as the base material is the "ThinSieve™" nickel sheets produced by Molecule Works Inc., Richland, Wash., which can have porous sizes below 1 μm and high surface areas. These porous sheets can be obtained with thicknesses in the range of 20 to 200 μm, and have the following characteristics:

| | |
|---|---|
| Material density, g/cc | 8.9 |
| Porosity | 0.45 |
| Pore size, μm | 0.4 |
| Sheet density, g/cc | 4.895 |
| Surface area, m$^2$/cm$^3$ | 4.5 |
| Surface area, m$^2$/g | 0.92 |

A sample matrix is shown below in Table 4.

TABLE 4

| Porous material | Coating | Silicate form |
|---|---|---|
| Porous Ni | n/a | Silsesquioxane |
| Porous Ni | 0.5 nm Ru | Silsesquioxane |
| Porous Ni | 2 nm Ru | Silsesquioxane |
| SBA-15 | 0.5 nm Ru | Silsesquioxane |
| SBA-15 | 2 nm Ru | Silsesquioxane |
| Porous Ni | 2 nm Fe | Silsesquioxane |
| Porous Ni | 2 nm Co | Silsesquioxane |
| SBA-15 | 2 nm Fe | Silsesquioxane |
| SBA-15 | 2 nm Ru | Silsesquioxane |

Examples

Experimental methods: The Ru(0001) single crystal surface was cleaned with cycles of Ar* sputtering and annealing at 1400 K. It was then exposed to 3×10−6 mbar O$_2$ at 1200 K in order to form a chemisorbed 3O-(2×2)-Ru(0001) overlayer. The silica and aluminosilicate bilayers were grown on the oxygen precovered ruthenium surface. Briefly, Si and Al were thermally evaporated onto the 3O-(2×2)-Ru (0001) surface at room temperature under 2×10$^{-7}$ mbar of O$_2$, followed by oxidation at 1200 K in 3×10$^{-6}$ mbar O$_2$ for 10 min and slowly cooled down in O$_2$ environment. Various 2D zeolite films were used in this work (SiO$_2$, Al$_{0.33}$Si$_{0.67}$O$_2$, and Al$_{0.35}$Si$_{0.65}$O$_2$). The relative aluminum content was determined by comparing the XPS peak intensities of the Al 2s and Si 2p. In DFT calculation, HAl$_{0.375}$Si$_{0.625}$O$_2$ was used to model the aluminosilicate films.

AP-XPS measurements were carried out at the 23-1 D-2 beamline (IOS) of the National Synchrotron Light Source II (NSLS-II) and the X1A1 beamline of NSLS. The main chamber (base pressure=2×10$^{-9}$ mbar) of the end station was equipped with a differentially pumped hemispherical analyzer (Specs Phoibos 150 NAP), which was offset by 70° from the incident synchrotron light. IRRAS measurements were carried out using a home-built system described previously. The noble gases (He, Ne, Ar, Kr, and Xe) were introduced into the main chamber through precision variable leak valves for the trapping studies.

Computational Methods

DFT calculations were performed using plane-wave basis set and the projector augmented wave formalism implemented in the Vienna Ab initio simulation package (VASP). The consistent exchange van der Waals density functional (vdW-DF-cx) was used to describe the nonlocal vdW interactions. The choice of vdW-DF-cx was justified by its performance for both Ru and chabazite, as tested in the previous works. Ru(0001) substrate was modeled using five layers of Ru atoms and chemisorbed O atoms with a 0.5 ML coverage (p(2×1)-O/Ru(0001)). The system consists of silicate bilayer films on p(2×1)-O/Ru(0001) with two noble gas trapping concentrations. The lower concentration consists of gas-$(SiO_2)_{16}$/80/Ru(0001) in a 10.784 Å×9.339 Å×27 Å super cell where 25% of the cages are filled with gas atoms ($\Theta$=0.25) while a higher concentration with gas-$(SiO_2)_8$/40/Ru(0001) in a 5.392 Å×9.339 Å×27 Å super cell where 50% of the cages are filled ($\Theta$=0.5). A kinetic energy cutoff of 800 eV was used, and the Brillouin zone was sampled with 8×4×1 for $\Theta$=0.5 and 4×4×1 for $\Theta$=0.25. Silicate films with noble gas atoms, chemisorbed O atoms, and top two layers of Ru atoms were allowed to relax in the structural optimization until forces were smaller than 0.01 eV Å-1. The core-level binding energies ($E_{BE}$) were calculated using the transition state model. The results were extrapolated to the infinite supercell size limit as described in the previous work. All $E_{BE}$ values of Ar 2p, Kr 3d, and Xe 3d were given relative to the $E_{BE}$ of trapped atoms at the interface (Table 1). The static dielectric constant of the silica film was calculated using VASP. The ionic contribution to the dielectric constant was calculated by the perturbation theory as implemented in VASP. Constrained DFT calculations were performed with the cc-pvtz basis set using Q•chem.

In order to obtain $E_{des}$ from the $\Theta$(t, 7) data from experiment, the first-order reaction law $\Theta = \Theta_0 \exp(-kt)$ was used, where $\Theta_0$ were taken from the first XPS data point from 298 K. The desorption rate constants (k) were evaluated based on the Arrhenius equation $k = A \exp(-E_{des}/k_B T)$ where $k_B$ is the Boltzmann constant and T is the temperature in desorption experiments. $\Theta$(t, T) was then fitted with the experiment data to obtain the desorption barriers $E_{des}$. Three $E_{des}$ are needed due to the defects. The fitted $E_{des}$ were then compared with $E_{des\text{-}DFT}$ from DFT calculated using the climbing image nudged elastic band method (CI-NEB) implemented in VASP. To compare with $E_{des}$ from the experiment, $E_{des}$ in $\Theta$=0.25 were used and ZPE correction were included. The ZPE corrected $E_{des}$ are summarized in Table 2. The pre-exponential factor A is calculated based on the transition state theory using the following equation.

$$A = \frac{1}{L}\sqrt{\frac{k_B T}{2\pi m}} \exp\left(\frac{\Delta S}{k_B}\right) \quad \text{(Equation 3)}$$

where L is the thickness of the bilayer after the trapping of atoms and m is the mass of the trapped atoms. $\Delta S$ is the entropy difference of the initial ($S_{ini}$) and the transition state ($S_{ts}$). In canonical ensemble, the entropy is calculated as the following equation.

$$S = k_B \sum_0^n \left[\frac{X_i}{e^{x_i}-1} - \ln(1 - e - x_i)\right] \quad \text{where} \quad \text{(Equation 4)}$$

$$X_i = \frac{h\nu_i}{k_B T'} \quad \text{(Equation 5)}$$

and where n is the number of phonon modes. The vibrational frequencies were calculated by the finite displacement method as implemented in VASP. $\Delta S$ are summarized in Table 2. During the calculations of the vibrational frequencies, the positions of the bilayer and Ru substrate are kept fixed.

In an experiment, individual polygonal prism organosilicate cages (known as silsesquioxanes) were deposited on a ruthenium thin film. Ambient pressure X-ray photoelectron spectroscopy was then used to show that these systems can trap noble gases. These experiments generalize the concept that nanoporous cages in contact with a conductor (ruthenium in this case), and an ionizer (X-rays) can trap gases that fit in such cages. This supports the general applicability of the present device of nanopores+ conductor+ ionizer, beyond the case of two-dimensional materials and metal single crystals. This can be extended to a variety of morphologies where the nanoporous material and the conductor are in contact and there is a source of ionizing radiation. Note that ionizing radiation is already present in many nuclear energy applications or wherever radioactivity is present. Therefore, an ionizer is not needed for these applications.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method of trapping noble gas atoms or molecules comprising:
   providing a metallic substrate;
   forming one or more oxide nanocages on the metallic substrate to form a gas trapping assembly;
   contacting the gas trapping assembly with a noble gas comprising noble gas atoms or noble gas molecules;
   ionizing the noble gas to form noble gas cations that enter the one or more oxide nanocages; and
   deionizing the noble gas cations,
   wherein, after the noble gas cations enter the one or more oxide nanocages of the gas trapping assembly, the deionization of the noble gas cations forms noble gas atoms or noble gas molecules that are trapped in the one or more oxide nanocages.

2. The method of trapping noble gas atoms or molecules according to claim 1, wherein the metallic substrate is selected from the group consisting of ruthenium (Ru), nickel (Ni), iron (Fe), copper (Cu), gold (Au), and cobalt (Co).

3. The method of trapping noble gas atoms or molecules according to claim 1, wherein the one or more oxide nanocages comprises silica or aluminosilicate.

4. The method of trapping noble gas atoms or molecules according to claim 3, wherein the one or more oxide nanocages further comprise an additional component selected from the group consisting of aluminum, titanium, iron, boron, and phosphorus.

5. The method of trapping noble gas atoms or molecules according to claim 1, wherein the noble gas is helium (He), neon (Ne), argon (Ar), krypton (Kr), xenon (Xe), or radon (Rn).

6. The method of trapping noble gas atoms or molecules according to claim 1, further comprising applying a voltage to the metallic substrate prior to ionizing the noble gas.

7. The method of trapping noble gas atoms or molecules according to claim 1, wherein the metallic substrate is a thin sheet or thin film.

8. The method of trapping noble gas atoms or molecules according to claim 1, wherein the noble gas contacts the gas trapping assembly at a temperature of at least 70° F.

9. The method of trapping noble gas atoms or molecules according to claim 1, wherein the noble gas is ionized using an ionizer.

10. The method of trapping noble gas atoms or molecules according to claim 1, wherein the noble gas cations gain electrons from the metallic substrate after entering the one or more oxide nanocages and form noble gas atoms or noble gas molecules.

11. The method of trapping noble gas atoms or molecules according to claim 1, further comprising separating the one or more oxide nanocages from the metallic substrate after the noble gas cations are deionized.

12. The method of trapping noble gas atoms or molecules according to claim 1, wherein the metallic substrate is a porous metallic substrate.

13. The method of trapping noble gas atoms or molecules according to claim 1, wherein the noble gas contacts the gas trapping assembly in a sealed chamber.

14. The method of trapping noble gas atoms or molecules according to claim 1, wherein the one or more oxide nanocages have a plurality of openings having a maximum dimension, and wherein the maximum dimension of the openings is less than 2.80 Å.

15. The method of trapping noble gas atoms or molecules according to claim 1, wherein the method forms clathrate compounds.

16. The method of trapping noble gas atoms or molecules according to claim 1, wherein the oxide nanocages are polygonal prism oxide nanocages.

17. The method of trapping noble gas atoms or molecules according to claim 1, wherein the oxide nanocages are cubic oxide nanocages, pentagonal prism oxide nanocages, hexagonal prism oxide nanocages, heptagonal prism oxide nanocages, or octagonal prism oxide nanocages.

18. The method of trapping noble gas atoms or molecules according to claim 1, wherein an ionizer is used to ionize the noble gas.

19. A method of trapping noble gas atoms or molecules comprising:
providing a metallic substrate, wherein the metallic substrate is selected from the group consisting of ruthenium (Ru), nickel (Ni), iron (Fe), copper (Cu), gold (Au), and cobalt (Co);
forming one or more oxide nanocages on the metallic substrate to form a gas trapping assembly, wherein the one or more oxide nanocages comprises silica or aluminosilicate;
applying a voltage to the metallic substrate;
contacting the gas trapping assembly with a noble gas comprising noble gas atoms or noble gas molecules;
ionizing the noble gas to form noble gas cations that enter the one or more oxide nanocages; and
deionizing the noble gas cations,
wherein, after the noble gas cations enter the one or more oxide nanocages of the gas trapping assembly, the deionization of the noble gas cations forms noble gas atoms or noble gas molecules having a maximum size that are trapped in the one or more oxide nanocages, and wherein the one or more oxide nanocages have a plurality of openings having a maximum dimension, and wherein the maximum dimension of the openings is less than the size of at least one noble gas atom or molecule.

20. The method of trapping noble gas atoms or molecules according to claim 19, wherein the oxide nanocages are cubic oxide nanocages, pentagonal prism oxide nanocages, hexagonal prism oxide nanocages, heptagonal prism oxide nanocages, or octagonal prism oxide nanocages.

* * * * *

UNITED STATES PATENT AND TRADEMARK OFFICE
CERTIFICATE OF CORRECTION

| | |
|---|---|
| PATENT NO. | : 12,005,391 B2 |
| APPLICATION NO. | : 17/008198 |
| DATED | : June 11, 2024 |
| INVENTOR(S) | : Boscoboinik et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 611 days.

Signed and Sealed this
Twenty-second Day of April, 2025

Coke Morgan Stewart
*Acting Director of the United States Patent and Trademark Office*